(12) United States Patent
Vendrow

(10) Patent No.: US 9,774,722 B2
(45) Date of Patent: *Sep. 26, 2017

(54) SYSTEM AND METHOD FOR MANAGING CALLS

(71) Applicant: RingCentral, Inc., Belmont, CA (US)

(72) Inventor: Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,957

(22) Filed: Nov. 9, 2016

(65) Prior Publication Data

US 2017/0094043 A1   Mar. 30, 2017

Related U.S. Application Data

(63) Continuation of application No. 14/869,180, filed on Sep. 29, 2015, now Pat. No. 9,521,173.

(51) Int. Cl.
| | | |
|---|---|---|
| *H04M 3/42* | (2006.01) | |
| *H04L 12/66* | (2006.01) | |
| *H04L 29/06* | (2006.01) | |
| *H04W 4/08* | (2009.01) | |
| *H04W 68/00* | (2009.01) | |
| *H04M 1/725* | (2006.01) | |
| *H04M 3/56* | (2006.01) | |

(52) U.S. Cl.
CPC ...... *H04M 1/72552* (2013.01); *H04L 65/403* (2013.01); *H04M 1/72583* (2013.01); *H04M 3/563* (2013.01); *H04W 4/08* (2013.01); *H04W 68/005* (2013.01)

(58) Field of Classification Search
CPC ......... H04M 3/42042; H04M 3/42059; H04M 3/5183; H04M 3/523; H04M 2201/42
USPC ............ 379/201.01, 202.01, 207.15, 205.01; 370/352

See application file for complete search history.

(56) References Cited

U.S. PATENT DOCUMENTS

| | | | |
|---|---|---|---|
| 8,839,129 B2 * | 9/2014 | Lau | G06F 3/0488 715/769 |
| 8,881,029 B2 | 11/2014 | Thapa | |
| 2009/0034696 A1 | 2/2009 | Ramanathan | |
| 2010/0199340 A1 | 8/2010 | Jonas et al. | |
| 2010/0215166 A1 | 8/2010 | Siegel | |
| 2012/0030289 A1 | 2/2012 | Buford et al. | |
| 2015/0222677 A1 | 8/2015 | Couse et al. | |
| 2016/0127428 A1 | 5/2016 | Flunkert et al. | |

* cited by examiner

*Primary Examiner* — Thjuan K Addy

(74) *Attorney, Agent, or Firm* — Finnegan, Henderson, Farabow, Garrett & Dunner LLP

(57) ABSTRACT

A computer-implemented method for managing calls in a collaboration environment is provided. The method includes receiving, by a processor, a call into a collaboration session of the collaboration environment. The method also includes identifying, by the processor, a user from a plurality of users associated with the collaboration session, based on at least one of contextual information regarding the call and information regarding the plurality of users. The method further includes providing, by the processor, an interface on a device associated with the identified user, wherein the interface enables the identified user to instruct the device to handle the call within the collaboration session.

21 Claims, 7 Drawing Sheets

SYSTEM AND METHOD FOR MANAGING CALLS

CROSS REFERENCE TO RELATED APPLICATION(S)

This is a continuation of application Ser. No. 14/869,180, filed Sep. 29, 2015, the entire content of which is incorporated herein by reference.

TECHNICAL FIELD

The present disclosure relates to the field of communication systems and, more particularly, to systems and methods for managing calls.

BACKGROUND

In some group electronic communication environments, such as a collaboration environment, group members, users, or participants engage in online and/or offline communications to exchange ideas and information, discuss work related issues, share documents and files, etc. A collaboration environment refers to a virtual (e.g., computerized) and/or physical environment in which users (also referred to as participants) collaborate with each other by exchanging information and data. For example, in a collaboration environment, participants communicate with each other via emails, text messages, chats, audio messages, video messages, etc. Participants can also exchange files and documents and review saved or archived communication records such as electronic messages (e.g., emails and text messages) and shared documents and/or files. A collaboration environment is implemented as a system that includes both software (e.g., software applications) and hardware components (e.g., computing devices, circuits, etc.). A collaboration environment includes one or a plurality of collaboration sessions.

A collaboration session in a collaboration environment can be implemented in a desktop environment as, e.g., a standalone desktop client application or a web-based application integrated within a web browser, such as Firefox, Internet Explorer, Safari, etc. The collaboration session in a desktop environment can be implemented on a desktop computer, a laptop, etc. A collaboration session can also be implemented in a mobile environment as a standalone mobile client application (or app) or as a web-based application integrated within a mobile web browser provided in a mobile environment, such as mobile versions of Firefox, Internet Explorer, Safari, etc. In both the desktop environment and the mobile environment, a collaboration session includes a user interface, such as a graphical user interface (GUI) that is a standalone software interface or integrated within a web browser. A collaboration session refers to an ongoing collaboration session or a collaboration session occurred in the past.

In a collaboration session (e.g., a chat session, a group meeting or conference session), members or participants of the collaboration session may receive a call, which may be a telephone call (including a voice message) that uses landline phone services, cellular wireless phone services, voice over IP (VoIP) phone services. The call may also include an audio call and/or a video call that uses technologies other than traditional phone services, such as desktop and/or mobile applications that enable audio and/or video communication. For example, while a collaboration session is underway, a participant or the collaboration session may receive a call from a caller who is not a participant of the collaboration session. As another example, while a participant is reviewing archived communication content of a collaboration session that is not currently underway (e.g., a past collaboration session), the participant may receive a call. The call into the collaboration session may be initiated from outside of the collaboration session. The term "outside" means the call is initiated by a caller using a device not included in devices and systems associated with the collaboration session. For example, the caller can be a person or a machine (e.g., a computer), which does not currently participate in the ongoing collaboration session or did not participate in the past collaboration session. The person or machine calls a collaboration session or a participant of the collaboration session using a device, such as telephone that is not a device associated with the collaboration session (hence the call is initiated from outside of the collaboration session). In some embodiments, the caller may be a participant of the collaboration environment, such as a participant of another collaboration session. For example, a first participant of a first collaboration session may call a second collaboration session or a second participant of a second collaboration session using a user device associated with the first collaboration session or using a telephone, which are not devices associated with the second collaboration session (hence the call to the second collaboration session is initiated from outside of the second collaboration session). In some embodiments, the caller is not a participant of the collaboration environment. For example, the caller is a user of a telephone system that is separated from the collaboration system. The caller initiates a call to a collaboration session using a telephone device included in the telephone system (hence the call is initiated from outside of the collaboration session).

When the collaboration session receives a call initiated from outside of the collaboration session, the existing collaboration systems do not enable users to manage the call in a convenient way. In some systems, the users have to leave the collaboration systems to answer the call.

SUMMARY

In one disclosed embodiment, a computer-implemented method for managing calls in a collaboration environment is disclosed. The method includes receiving, by a processor, a call into a collaboration session of the collaboration environment. The method also includes identifying, by the processor, a user from a plurality of users associated with the collaboration session, based on at least one of contextual information regarding the call and information regarding the plurality of users. The method further includes providing, by the processor, an interface on a device associated with the identified user, wherein the interface enables the identified user to instruct the device to handle the call within the collaboration session.

In another disclosed embodiment, a communication server for managing calls in a collaboration environment is disclosed. The communication server includes at least one memory configured for storing instructions. The communication server also includes at least one processor in communication with the at least one memory and configured to execute the instructions to receive a call into a collaboration session of the collaboration environment. The at least one processor is also configured to execute the instructions to identify a user from a plurality of users associated with the collaboration session, based on at least one of contextual information regarding the call and information regarding the plurality of users. The at least one processor is further configured to provide an interface on a device associated with the identified user, wherein the interface enables the identified user to instruct the device to handle the call within the collaboration session.

In yet another disclosed embodiment, an electronic device is disclosed. The electronic device includes a display configured to display a collaboration interface for a collaboration session. The electronic device also includes at least one processor configured to receive a call into the collaboration session. The at least one processor is also configured to provide an interface within the collaboration interface of the collaboration session on the display, the interface including one or more selectable elements for the user to handle the call within the collaboration session.

In yet another disclosed embodiment, a non-transitory computer-readable medium is provided. The computer-readable medium is encoded with instructions, which when executed by a processor, cause the processor to perform a method for managing calls in a collaboration environment. The method includes receiving a call into a collaboration session of the collaboration environment. The method also includes identifying a user from a plurality of users associated with the collaboration session, based on at least one of contextual information regarding the call and information regarding the plurality of users. The method further includes providing an interface on a device associated with the identified user, wherein the interface enables the identified user to instruct the device to handle the call within the collaboration session.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
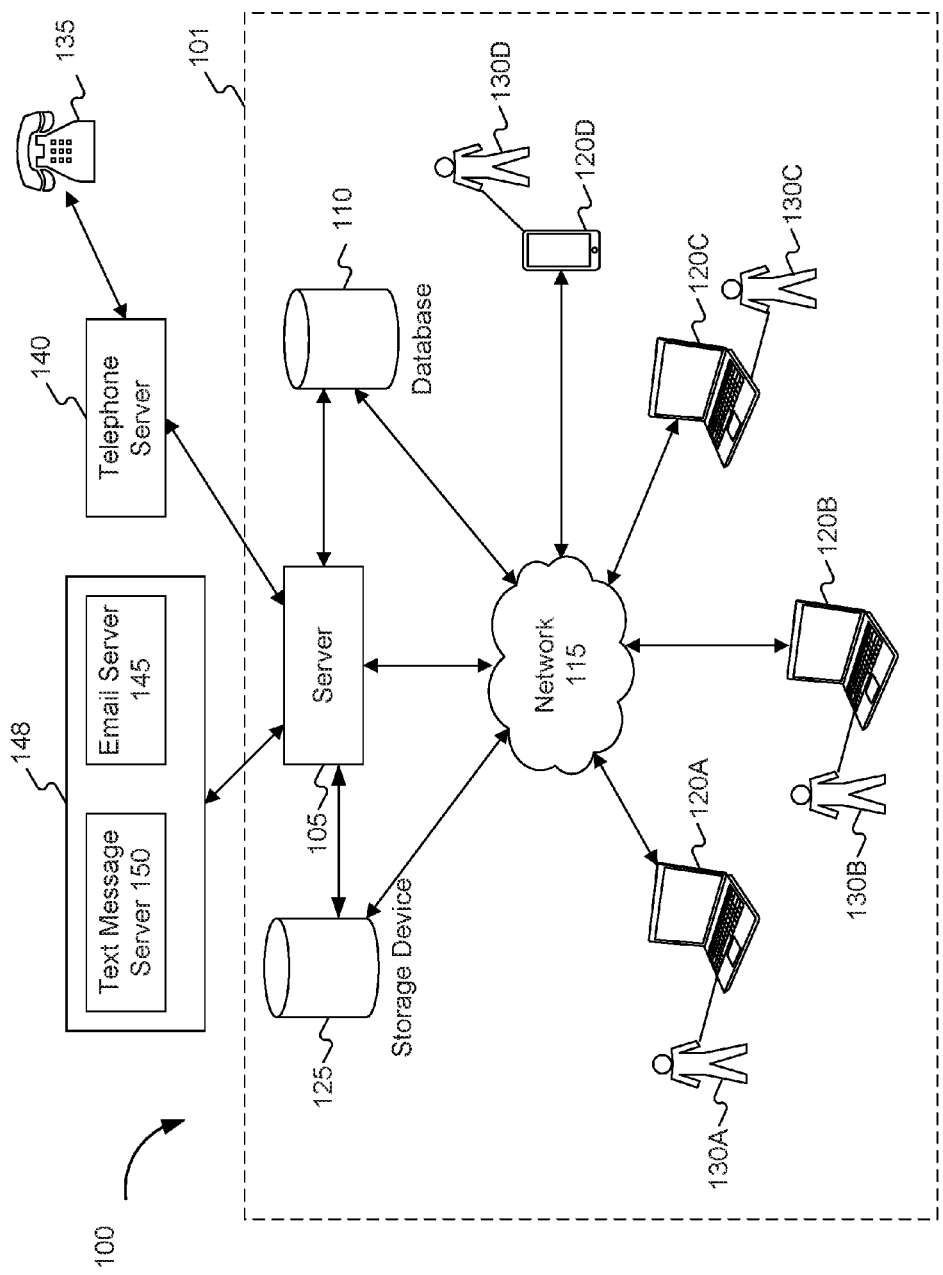
FIG. 1 is a diagram of an example of a communication system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

In an online or offline collaboration session (e.g., a chat session), participants perform various activities, such as communicating with each other to exchange information and/or documents, reviewing communication records, retrieving a shared document, etc. When the collaboration session or a participant of the collaboration session receives a call, such as a telephone call, an audio and/or video call, initiated from outside of the collaboration session, one or more of the participants of conventional collaboration systems have to leave the collaboration session and use a separate client or application having a separate user interface for answering the call. In some instances, the separate client or application can be running on a device that is different from the device(s) being used by the participant(s) of the collaboration session when participating in the collaboration session. Thus, it is desirable to provide systems and methods that enable a participant of the collaboration session to manage calls within the collaboration session.

Embodiments of the present disclosure provide methods, devices, and systems for managing calls, such as telephone calls, within a collaboration session. Telephone calls include landline calls, cellular wireless calls, VoIP calls, etc. Below, for convenience, telephone calls are used as example calls, although the same or similar disclosure may also be applied to other types of calls, such as video and/or audio calls performed using a collaboration interface or other audio/video applications between different collaboration sessions. Consistent with disclosed embodiments, a computer-implemented method for managing a call in a collaboration environment is disclosed. The method includes receiving, by a processor, the call from outside of a collaboration session of the collaboration environment. The method also includes identifying, by the processor, a user from a plurality of users of the collaboration session, based on at least one of contextual information regarding the call and information regarding the plurality of users. The method further includes providing, by the processor, an interface on a device associated with the identified user, wherein the interface enables the identified user to instruct the device to handle the call within the collaboration session.

The disclosed embodiments also include a communication server for managing a call in a collaboration environment. The communication server includes at least one memory configured for storing instructions. The communication server also includes at least one processor in communication with the at least one memory and configured to execute the instructions to receive the call from outside of a collaboration session of the collaboration environment. The at least one processor is also configured to execute the instructions to identify a participant or user from a plurality of participants or users of the collaboration session, based on at least one of contextual information regarding the call and information regarding the plurality of participants or users. The at least one processor is further configured to provide an interface on a device associated with the identified user, wherein the interface enables the identified user to instruct the device to handle the call within the collaboration session.

The disclosed embodiments further include an electronic device. The electronic device includes a display configured to display a collaboration interface for a collaboration session. The electronic device also includes at least one processor configured to receive a call from outside of the collaboration session. The at least one processor is also configured to provide an interface within the collaboration interface of the collaboration session on the display, the interface including one or more selectable elements for the user to handle the call within the collaboration session.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

The disclosed methods and systems are implemented in the desktop and/or mobile environments. In the desktop and/or mobile environments, the disclosed collaboration methods and systems are implemented as a stand-alone application or software, or are implemented within a web browser, such as a WebRTC-based environment. The present disclosure arises out of the realization that conventional collaboration systems do not enable a user to manage a call (e.g., a telephone call) within a collaboration session, and often require the user to use a separate device or application to manage the call. Requiring the user to use a separate device or application separate from the collaboration session is cumbersome, and reduces collaboration productivity. Moreover, requiring the user to have separate devices or applications increases the operation costs. The disclosed methods and systems enable a user of a collaboration session to manage a call within the collaboration session, without having to resort to a separate device or software application. Productivity is thus improved and operation costs are reduced.

FIG. 1 shows an example of a communication system 100 in which various implementations as described herein may be practiced. Communication system 100 represents, for example, a collaborative environment that allows a group of participants (e.g., 130A-130D) using associated user devices (e.g., 120A-120D) (collectively user devices 120) to engage in group communication, such as instant messaging (IM), email, voice over IP (VoIP) phone call, land-line telephone call, wireless cellular phone call, online audio/video conferencing, etc., as well as sharing content associated with the collaboration such as documents, audio/video content, links to Internet or web based content, etc. Communication system 100 reflects a communication platform that allows a group of participants (e.g., 130A-130D) to exchange messages, documents, videos, gaming, and otherwise interact and/or exchange information with one another in real-time using associated user devices (e.g., 120A-120D). For example, participants 130A-130D may belong to a same community or workspace, or share a common interest or goal, and a communication group may be set up to enhance the efficiency and productivity of information exchange among the participants. In the present disclosure, information exchanged among a group of participants may include texts, messages, emails, shared documents, shared data files, audio/video recordings, images, or any other types of information exchanged between two or more individuals.

As shown in FIG. 1, communication system 100 includes a collaboration system 101. Collaboration system 101 includes one or more user devices 120A-120D, a network 115, a communication server 105, and a database 110. Collaboration system 101 also includes a storage device 125, such as a hard disk, a memory, etc., configured to store data. The components and arrangements shown in FIG. 1 are not intended to limit the disclosed embodiments, as the system components used to implement the disclosed processes and features may vary. For example, communication system 100 may include multiple communication servers 105, and each communication server 105 may host a certain type of communication service, e.g., IM, VoIP, video conferencing, such that various types of multimedia services may be provided to user devices 120.

Communication server 105 is also referred to as a collaboration server 105 hereinafter. Collaboration server 105 is configured to provide communication services, such as, text-based, audio-based, and/or video-based communications, etc., to user devices 120A-120D. Collaboration server 105 includes both hardware and software components, such as a memory, a processor, computer instructions or code.

Communication system 100 includes a telephone server 140 and an electronic message server 148, which includes an email server 145 and a text message server 150. In some embodiments, electronic message server 148 is provided with an email function and a text messaging function, and separate email server 145 and text message server 150 are not provided. Similarly, the electronic message server 148 is configured to send and receive faxes in some embodiments. The term "electronic message" includes text messages, emails, faxes, audio and/or video messages, short message service (SMS) messages, multimedia messaging service (MMS) messages, faxes, and the like. At least one of telephone server 140 and electronic message server 148 is separate from collaboration system 101 and connected with collaboration server 105 via the Internet or other networks, such as telephone lines, wireless cellular networks, local area networks (LAN), etc. Each of telephone server 140 and electronic message server 148 includes both hardware and software components, such as a memory, a processor, computer instructions or code. In some embodiments, one or both of telephone server 140 and electronic message server 148 are included within collaboration system 101. For example, in some embodiments, electronic message server 148 is included in collaboration system 101, and telephone server 140 is included in a telephone system, such as a landline telephone system, a wireless cellular telephone system, or a VoIP telephone system, which is separate from and outside of collaboration system 101.

Telephone server 140 is connected to a telephone 135 through the telephone system (not shown). A plurality of telephones 135 may be included in the telephone system and connected to telephone server 140. Telephone server 140 is also connected with one or more user devices 120A-120D through the telephone system. When a user of telephone 135 or a user device (e.g., one of user devices 120) initiates a telephone call to collaboration system 101, the telephone call is processed by the telephone system, e.g., by telephone server 140. Telephone server 140 directs or routes the telephone call to collaboration system 101. Telephone server 140 includes various hardware and software components known in the art to direct or route the call.

The disclosed collaboration methods and systems can be implemented in a desktop environment and/or a mobile environment. In each environment, the disclosed collaboration methods and systems can be implemented as a standalone application or software (e.g., a desktop client application or a mobile app). Alternatively, the collaboration application that implements the disclosed methods and systems can be integrated within a web browser (a desktop web browser or a mobile web browser). In the desktop environment, the standalone desktop collaboration application or the desktop web browser that integrates the collaboration application is provided with call handling functions. A call can be directed or routed, by telephone server 140, to the standalone desktop collaboration application or software, or to the desktop web browser. The standalone desktop collaboration application or software or the desktop web browser receives the call and handles the call in accordance with the disclosed embodiments.

In the mobile environment, the mobile collaboration app or mobile web browser that integrates the collaboration app is provided with call handling functions. A call can be directed or routed, by telephone server 140, to the mobile collaboration app or the mobile web browser. The mobile collaboration app or mobile web browser receives the call and handles the call in accordance with the disclosed embodiments.

Alternatively and additionally, in some mobile environments, when user devices 120A-120D are smart phones and other mobile devices, the disclosed methods and systems can use a native dialer (e.g., a telephony service circuit and/or software application) provided with the smart phone or other mobile device to receive and handle calls. A call routed to the smart phone or other mobile device can be received and handled by the native dialer. The native dialer can be a typical dialer that is provided within smart phone or other mobile device for making or receiving phone calls. Alternatively, the native dialer can be an independent, dedicated native dialer specifically designed and programmed for handling calls received by collaboration systems 101. In either case, the native dialer receives calls and cooperates with the mobile collaboration app or the mobile web browser that integrates the collaboration app. Similarly, in some example embodiments, the native dialer can communicate with the collaboration system 101 through a telephony application programming interface (API). For example, when the native dialer receives the call, the native dialer forwards the call to the mobile collaboration app or the mobile web browser that integrates the collaboration app. In the mobile environment, when a native dialer is used, the collaboration server 105 can be eliminated in some embodiments. In such embodiments, a call is directly routed to the native dialer, instead of being routed to the collaboration server 105 before being routed to the native dialer. For example, in a collaboration session including one or more participants, a call directed to the collaboration session can cause the native dialers provided in all or some of the smart phones or other mobile devices associated with the one or more participants to ring. As another example, a caller dials a telephone number associated with the smart phone or other mobile device associated with a particular participant, and the native dialer provided with the smart phone or other mobile device receives and handles the call, thereby bypassing collaboration server 105. Accordingly, in some embodiments, collaboration server 105 is not included. In some embodiments, when native dialers are used to receive and handle calls, collaboration server 105 can co-exist. Collaboration server 105 may be configured to handle other processes or functions associated with collaboration system 101.

In some embodiments, a smart phone or other mobile device uses both the native dialer and the mobile application or web browser that is provided with call handling functions. When the smart phone or mobile device receives a call, at least one of the native dialer, the mobile application, and the mobile web browser rings to alert the user of the incoming call. The user handles the call using at least one of the native dialer, the mobile application, or the mobile web browser. In some embodiments, the native dialer handles the call. In some embodiments, the native dialer re-routes the call to the mobile application or mobile web browser, which is provided with call handling functions. The mobile application or web browser handles the call re-routed from the native dialer. In some embodiments, the native dialer rings when receiving the call, and the mobile application or web browser takes over control of the native dialer and handles the call using the native dialer or the call handling functions provided with the mobile application or web browser.

Collaboration system 101 includes one or a plurality of online and/or offline collaboration sessions. Each collaboration session includes one or a plurality of participants. A participant of a collaboration session may be a participant of an ongoing, current collaboration session, or a participant of a past collaboration session. In some embodiments, each collaboration session is associated with a telephone number. A user of telephone 135 (hereinafter "caller") can call the telephone number associated with the collaboration session to reach participants of the collaboration session.

In some embodiments, collaboration sessions are not associated with telephone numbers. A caller can call a telephone number associated with collaboration system 101, and collaboration server 105 identifies a target or destination collaboration session, from the plurality of collaboration sessions, as the recipient of the telephone call based on, e.g., contextual information associated with the call or caller, and/or information (e.g., characteristics) regarding the collaboration sessions. Collaboration server 105 directs the telephone call to the identified target collaboration session.

In some embodiments, each user device 120 associated with each participant of a collaboration session is associated with a telephone number, and a caller dials the telephone number to reach the particular participant associated with the user device 120. In some embodiments, when a participant receives a call, the participant determines, based on contextual information associated with the call or the caller, which has been received by the participant either before receiving the call or at substantially the same time as the call, that the call should be directed to a collaboration session or another participant. The participant who receives the call then forwards the call to the collaboration session or another participant. The contextual information associated with the call or the caller is identified by collaboration server 105 from various sources, such as electronic messages received from electronic message server 148.

In some embodiments, after directing the telephone call to the identified target collaboration session, collaboration server 105 further identifies a user (or participant) from a plurality of users (or participants) of the collaboration session, based on at least one of contextual information regarding the call and/or the caller, and information regarding the plurality of users (or participants) of the collaboration session. After identifying the participant to receive the call, collaboration server 105 directs the telephone call to the identified participant. In some embodiments, collaboration server 105 causes an interface to be displayed on a user device (e.g., one of user devices 120A-120D) associated with the identified participant. The interface may be displayed on the user device, for example, within a collaboration interface associated with the collaboration session. The collaboration interface is provided with user devices as a standalone application or software, or may be integrated within a web browser provided with the user devices.

The collaboration server 105 causes an interface to be displayed within the collaboration session on a user device (e.g., one of user devices 120A-120D). The interface enables a user to instruct an associated user device to handle calls within the collaboration session. In some example embodiments, the interface provides selectable or operable user interface elements (e.g., selectable, clickable, and/or touchable buttons) configured to receive a user input from the user. The user input instructs the user device to handle the call (e.g., to answer, forward, or reject the call, or to divert the call to voicemail, to place the call on hold, to park the call, etc.). In some embodiments, the user input includes instructions to the native dialer included in the user device that the telephone call will be handled by the standalone desktop or mobile collaboration application or the desktop or mobile web browser that integrates the collaboration application. In some embodiments, the selectable elements receive a drag and drop input from the user, which causes the selectable elements to be dragged and dropped onto an icon representing a specific user or participant, causing the user device to direct the telephone call to that specific user or participant. In some embodiments, the selectable elements are dragged and dropped onto an icon representing another collaboration session, causing the user device to direct the telephone call to that other collaboration session.

In some embodiments, communication system 100 includes more than one collaboration system 101, more than one telephone server 140, more than one electronic message server 148 (e.g., more than one email server 145, and/or more than one text message server 150). In some embodiments, a user device included in a first collaboration system 101 initiates, through the telephone system including telephone server 140, a call to a second collaboration system 101. The call to the second collaboration system is initiated from outside of second collaboration system 101, and hence outside of a collaboration session included in second collaboration system 101.

In some embodiments, the same collaboration system 101 includes a plurality of collaboration sessions, some of which may be ongoing collaboration sessions, and some of which may be deleted (e.g. temporarily deleted or masked) or archived collaboration sessions. A participant in a first collaboration session initiates a call, through the telephone system including telephone server 140, to a second collaboration session within the same collaboration system 101. The telephone call to the second collaboration session is initiated through telephone server 140. The call to the second collaboration session is initiated from outside of the second collaboration session.

Network 115 facilitates communications and sharing of content between user devices 120 and at least one of collaboration server 105, telephone server 140, and electronic message server 148. Network 115 is any type of network that provides communications, exchanges information, and/or facilitates the exchange of information between collaboration server 105, telephone server 140, electronic message server 148, and user devices 120. For example, network 115 can be the Internet, a Local Area Network, a cellular network, a public switched telephone network ("PSTN"), or other suitable connection(s) that enables communication system 100 to send and receive information between the components of communication system 100. Network 115 supports a variety of messaging formats, and a variety of services and applications for user devices 120. A network similar to network 115 may connect collaboration server 105, and telephone server 140, and electronic message server 148.

Collaboration server 105 is typically configured to provide collaboration services to user devices 120. The collaboration services use text based, audio based, and/or video based communication technologies. Collaboration server 105 includes a computer-based system including computer system components, desktop computers, workstations, tablets, hand held computing devices, memory devices, and/or internal network(s) connecting the components. Collaboration server 105 is configured to receive information from user devices 120 over network 115, process the information, store the information, and/or transmit information to user devices 120 over network 115.

In some embodiments, collaboration server 105 is configured to establish a collaboration session among a group of participants 130A-130D (collectively, participants 130) through associated user devices 120A-120D, manage the collaboration session for information exchange among participants 130, and control sharing of content among participants 130. In some embodiments, collaboration server 105 maintains and manages a plurality of group collaboration sessions simultaneously. In some embodiments, collaboration server 105 is configured to maintain a list of participants for each collaboration session, along with the role of each of the participants and their access control settings (e.g., a moderator who is the host of the collaboration session), a creator who created the collaboration session, a user who can post messages and participate in audio and/or video conferences and text-based communication among the group participants, etc. In some implementations, the functionality of collaboration server 105 described in the present disclosure is distributed among user devices 120A-120D. In some embodiments, a part or all of the communication content is stored in one or more of user devices 120, and one or more of user devices 120 perform the function of managing the collaboration session.

In some embodiments, collaboration system 101 includes at least one of a database 110 and a storage device 125. Database 110 and/or storage device 125 includes one or more physical or virtual storages in communication with collaboration server 105, directly or through network 115. For example, database 110 and/or storage device 125 include hard disks, flash drives, memory, magnetic tape, optical discs, etc., for storing data. Database 110 and/or storage device 125 store, for example, communication content (such as messages exchanged between participants, documents and/or files shared by various participants, communication history, etc.) of an ongoing collaboration session, and/or any previously completed collaboration session. Database 110 and/or storage device 125 also store text, video, and/or audio messages, documents, files, images, or shared content among communication participants 130. For example, storage device 125 and/or database 110 store electronic messages, such as, text messages received from text message server 150 and/or emails received from email server 145. The electronic messages are transmitted to collaboration server 105 and stored in storage device 125 and/or database 110 before, after, or at the time of a call to a collaboration session is initiated through telephone 135 and telephone server 140. Database 110 and/or storage device 125 also store communication history relating to a caller who makes a call to a collaboration session. The communication history includes prior communication content, such as electronic messages (e.g., emails and/or text messages), and phone calls involving the caller. The stored data, messages, documents, files, or other content provide contextual information about the call and/or the caller who initiated the call. Storage device 125 and/or database 110 store profile information regarding the users or participants of the collaboration sessions, such as, for example, a function within an organization, a job title, position in the organization chart, technical expertise, proficiencies, education, language, and prior communication with the caller, etc. The profile information also includes availability data of the users that indicate when each of the users may be available to answer a call.

The data stored in database 110 and/or storage device 125 is transmitted to collaboration server 105 before, after, or during an ongoing collaboration session. In some embodiments, the data stored in database 110 and/or storage device 125 is transmitted to collaboration server 105 before, after, or during a call is initiated from telephone 135 to a collaboration session. In some embodiments, database 110 and/or storage device 125 reside in a cloud-based server that is accessible by collaboration server 105 and/or user devices 120 through network 115. While database 110 and/or storage device 125 are illustrated as an external device connected to collaboration server 105, in some embodiments, database 110 also reside within collaboration server 105 as internal components of collaboration server 105.

As shown in FIG. 1, participants 130A-130D of a collaboration session communicate with one another using various types of user devices 120A-120D. User devices 120A-120D can be a television, tablet, computer monitor, video conferencing console, laptop computer, cellular phone, smart phone, wearable device, or the like with electronic communications capability. User devices 120A-120D include a screen for displaying data or be operatively connected with an external display for displaying data. User devices 120A-120D also include video/audio input devices such as a video camera, web camera, or the like. User devices 120A-120D include one or more software applications that facilitate the user devices to engage in electronic communications, such as electronic messages, VoIP calls, video/audio calls, video/audio conferences, with one another in a collaboration environment where each participant may view content shared by other participants and may share content that can be accessed by other participants in the collaboration environment (e.g., in a collaboration session). For example, each of user devices 120A-120D may display a collaboration interface enabling users of user devices 120A-120D to communicate with each other using text-based messages, audio-based messages, video-based messages, and to share content, such as documents, files, etc. In some embodiments, communication system 100 also includes devices without display or video capture capabilities, such as a cellular phone or a telephone 135.

Figure 2:
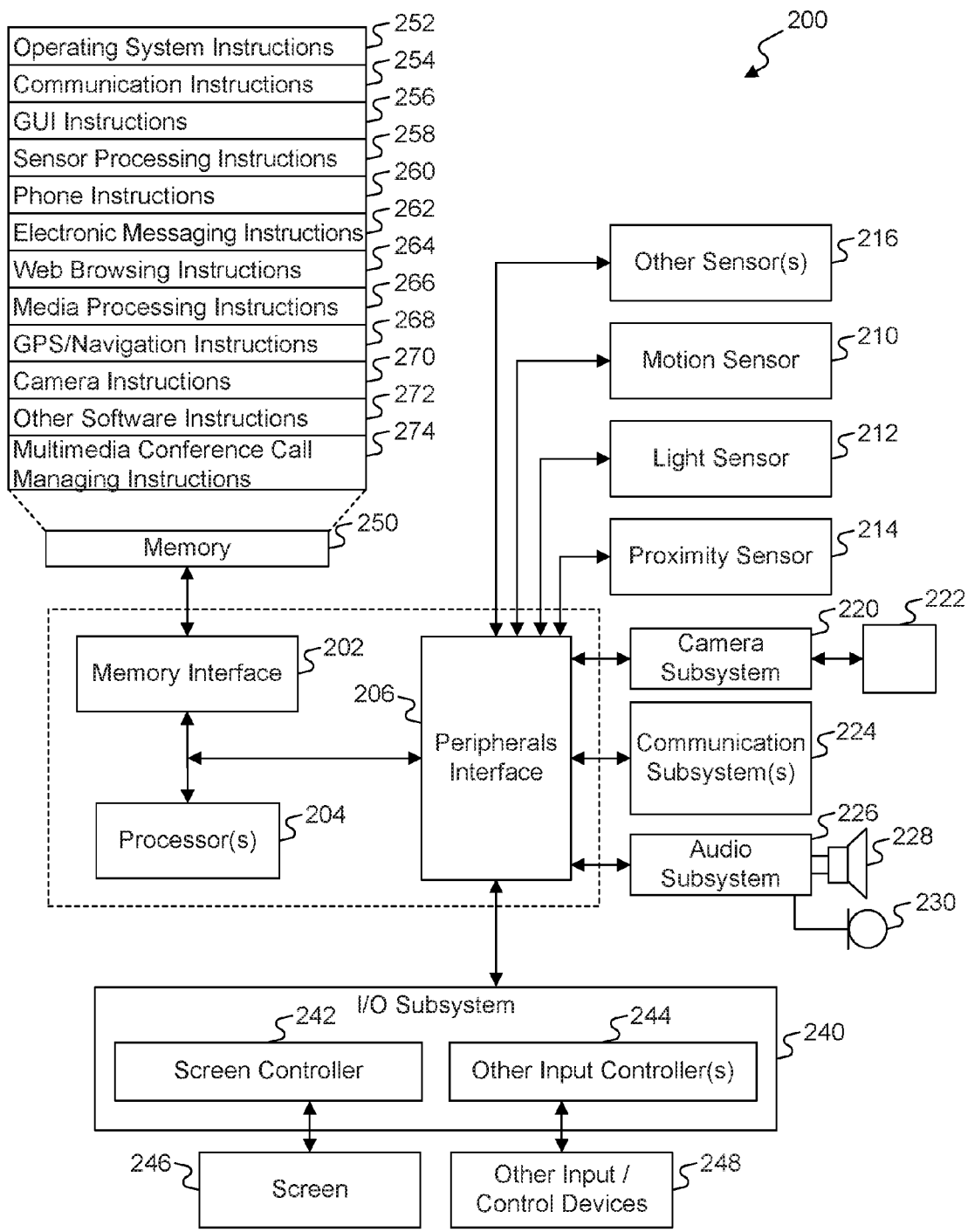
FIG. 2 illustrates example components of a user device for implementing embodiments consistent with the present disclosure.

FIG. 2 illustrates example components of a user device 200 for use in communication system 100. User device 200 implements computer programs, applications, methods, processes, or other software to perform embodiments described in the present disclosure. Each of user devices 120A-120D is the same as or similar to user device 200. As shown in FIG. 2, user device 200 includes a memory interface 202, one or more processors 204 such as data processors, image processors and/or central processing units, and a peripherals interface 206. Memory interface 202, one or more processors 204, and/or peripherals interface 206 are separate components or integrated in one or more integrated circuits. The various components in user device 200 are coupled by one or more communication buses or signal lines.

Sensors, devices, and subsystems are coupled to peripherals interface 206 to facilitate multiple functionalities. For example, a motion sensor 210, a light sensor 212, and a proximity sensor 214 are coupled to peripherals interface 206. Motion sensor 210 is configured to detect a motion (e.g., acceleration) and/or an orientation of user device 200. Light sensor 212 is configured to sense an amount of light, which is used to adjust the brightness of a screen of user device 200. Proximity sensor 214 is configured to detect a distance between user device 200 and an object outside of user device 200. The distance information is used for triggering near field communication with another user device 200, or any other device that provides near field communication functions.

Other sensors 216 are connected to peripherals interface 206, such as a positioning system (e.g., GPS receiver), a temperature sensor, a biometric sensor, or other sensing device, to facilitate related functionalities. A GPS receiver is integrated with, or connected to, user device 200. For example, a GPS receiver may be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, are utilized to facilitate camera functions, such as recording photographs and video clips.

Communication functions are facilitated through one or more communication subsystems 224, which may be wired or wireless communication subsystems. For example, communication subsystems 224 include an Ethernet port, radio frequency receivers and transmitters, WiFi or cellular wireless transceivers, and/or optical (e.g., infrared) receivers and transmitters. The specific design and implementation of the wireless/wired communication subsystem 224 depends on the communication network(s) over which user device 200 is intended to operate. For example, in some embodiments, user device 200 includes wireless/wired communication subsystems 224 designed to operate over a GSM network, a GPRS network, an EDGE network, a Wi-Fi or WiMax network, and a Bluetooth® network.

Communication subsystems 224 also include a subsystem for handling audio/video calls. The subsystem for handling calls includes a native dialer that includes a circuit and a software application configured to provide telephony services such as PSTN or VoIP calls. The native dialer enables a user of user device 200 to dial a phone number to initiate a call, and to receive and handle a call (e.g., answer the call, reject the call, hold the call, forward the call, divert the call to voice mail, conference multiple calls, etc.). In some embodiments, when a participant of a collaboration session receives a call on user device 200, the native dialer cooperates with a collaboration interface of the collaboration session. For example, in some embodiments, the native dialer forwards or re-routes the call to the desktop software application or mobile application that implements the collaboration methods disclosed herein, or to the desktop web browser or mobile web browser that implements the collaboration methods disclosed herein. In some embodiments, when the native dialer receives the call, processor 204 also receives contextual information associated with the call (e.g., an electronic message indicating the subject of the call). Processor 204 determines based on the contextual information that another participant or another collaboration session should receive the call, and instructs the native dialer to forward the call to the other participant or collaboration session. The native dialer includes a software application, which is displayed as an interface when a call is received, on screen 246 to alert the user of user device 200 of the incoming call. The interface includes one or more selectable elements for receiving user inputs. For example, the one or more elements include an element for answering a call, an element for rejecting or ignoring a call, an element for forwarding a call, an element for diverting a call to voice mail, an element for holding a call, and an element for conferencing multiple calls, etc. The native dialer may be part of the operating system 252 of the user device 200, or a standalone application such as a desktop client application or mobile application (app).

An audio subsystem 226 is coupled to a speaker 228 and a microphone 230 to facilitate voice-enabled functions, such as voice recognition, voice replication, digital recording, and telephony functions.

The I/O subsystem 240 includes a screen controller 242 and/or other input controller(s) 244. The screen controller 242 is coupled to a screen 246. Screen 246 is a touch screen or a non-touch screen, such as a CRT or LCD, LED non-touch screen. When screen 246 is a touch screen, screen 246 and screen controller 242 are configured to, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with screen 246. Screen 246 is used to implement virtual or soft buttons and/or a keyboard. In some embodiments, touch screen 246 is configured to receive user input, such as touching, tapping, double tapping, pressing, holding, swiping, dragging and dropping, clicking, double clicking, etc.

The other input controller(s) 244 is coupled to other input/control devices 248, such as one or more buttons, rocker switches, thumb-wheel, infrared port, USB port, and/or a pointer device such as a stylus.

Memory interface 202 is coupled to a memory 250. Memory 250 includes high-speed random access memory and/or non-volatile memory, such as one or more magnetic disk storage devices, one or more optical storage devices, and/or flash memory (e.g., NAND, NOR). Memory 250 stores an operating system 252, such as DRAWIN, RTXC, LINUX, iOS, UNIX, OS X, WINDOWS, or an embedded operating system such as VXWorkS. The operating system 252 includes instructions for handling basic system services and for performing hardware dependent tasks. In some implementations, operating system 252 is a kernel (e.g., UNIX kernel).

Memory 250 is configured to store communication instructions 254 to facilitate communicating with one or more additional devices, one or more computers and/or one or more servers. Memory 250 includes graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. Memory 250 also includes multimedia conference call managing instructions 274 to facilitate conference call related processes and instructions.

The phone instructions 260 include instructions to the native dialer provided within communication subsystems 224 of user device 200 for handling phone calls. For example, phone instructions include instructions, which when executed by processor 204, cause screen 246 to display an interface including one or more elements for receiving user inputs that instruct the native dialer how to handle the calls. The phone instructions include instructions corresponding to the various elements of the interface for handling the call.

In some embodiments, communication instructions 254 include software applications, such as a desktop client application, a mobile application (or app), a desktop web browser, and a mobile web browser, to facilitate connection with collaboration server 105 that hosts group communication between a group of participants. Graphical user interface (GUI) instructions 256 include a software program that facilitates a participant associated with user device 200 to receive communication content from collaboration server 105, provide user input, and so on. Graphical user interface instructions 256 include a software program that facilitates a participant associated with the user device 200 to provide a user input, such as selection of one of a plurality of selectable elements displayed on a screen, to instruct user device 200 to handle a call (e.g., to answer, reject, forward a call, or divert the call to voice mail).

Each of the identified instructions and applications correspond to a set of instructions for performing one or more functions described above. These instructions need not be implemented as separate software programs, procedures, or modules. In some embodiments, memory 250 includes additional instructions or fewer instructions. Furthermore, various functions of user device 200 are implemented in hardware and/or in software, including in one or more signal processing and/or application specific integrated circuits.

Figure 3:
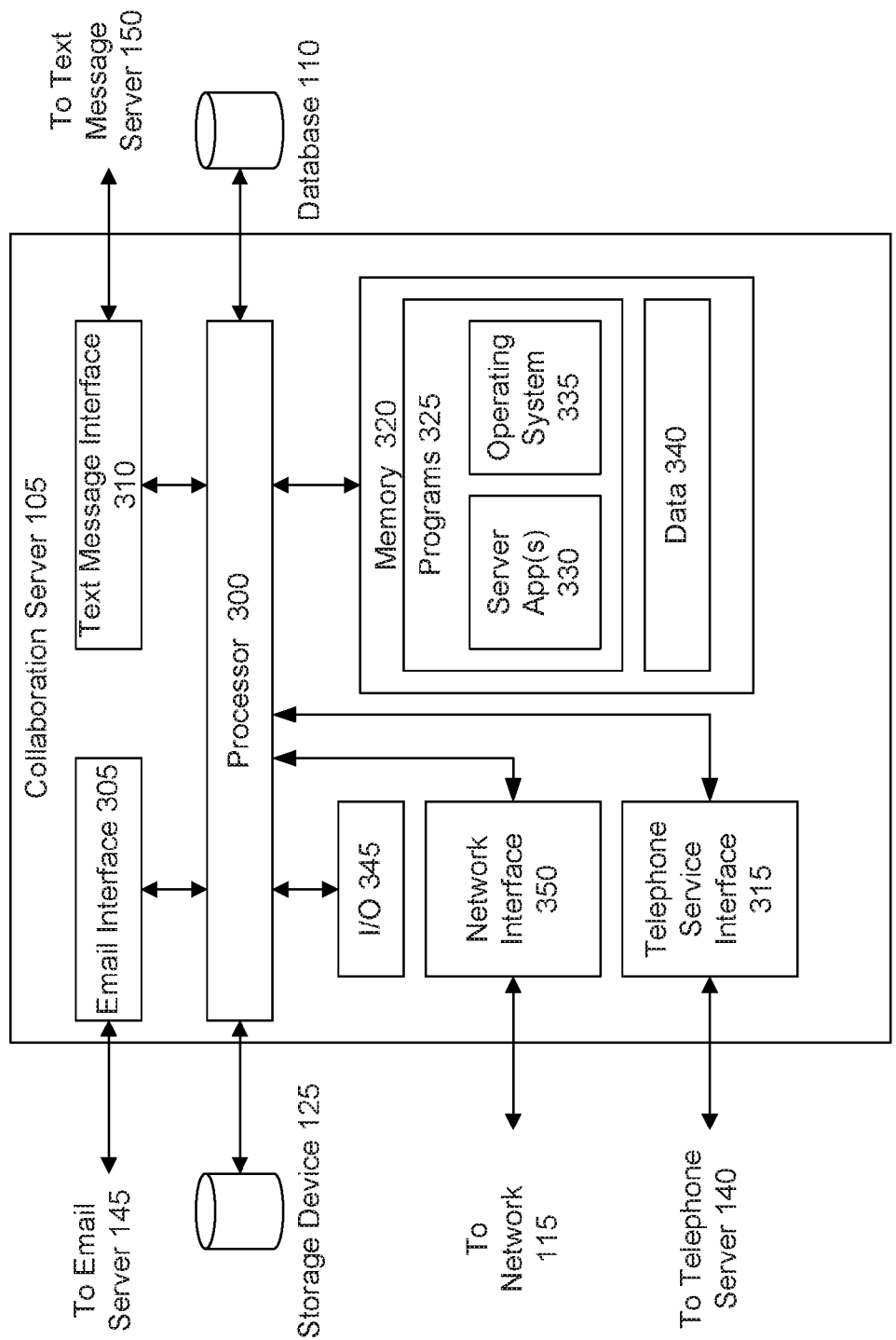
FIG. 3 is a diagram of an example communication server, in accordance with the disclosed embodiments.

FIG. 3 shows a diagram of an example collaboration server 105, consistent with the disclosed embodiments. As shown, collaboration server 105 includes one or more processors 300, an email interface 305, a text message interface 310, and a telephone service interface 315. Collaboration server 105 also includes a memory 320 configured to store programs 325. Programs 325 include server applications (or server apps) 330 and operating system 335. Memory 320 is also configured to store data 340. Collaboration server 105 further includes an input/output ("I/O") devices 345, a network interface 350, and a telephone service interface 315. Collaboration server 105 communicates with database 110 and/or storage device 125 through a suitable communication interface, such as a data communication bus, a wired communication port, and/or a wireless communication transceiver. In some embodiments, database 110 and/or storage device 125 are included within collaboration server 105. Collaboration server 105 is a single server or is configured as a distributed computer system including multiple servers, server farms, clouds, or computers that interoperate to perform one or more of the processes and functionalities associated with the disclosed embodiments.

Processor 300 includes one or more processing devices configured to perform functions of the disclosed methods, such as a microprocessor manufactured by Intel™ or manufactured by AMD™. Processor 300 constitutes a single core or multiple core processors executing parallel processes simultaneously. In some embodiments, processor 300 is a single core processor configured with virtual processing technologies. In some embodiments, processor 300 uses logical processors to simultaneously execute and control multiple processes. Processor 300 implements virtual machine technologies, or other technologies to provide the ability to execute, control, run, manipulate, store, etc. multiple software processes, applications, programs, etc. In some embodiments, processor 300 includes a multiple-core processor arrangement (e.g., dual, quad core, etc.) configured to provide parallel processing functionalities to allow collaboration server 105 to execute multiple processes simultaneously. In some embodiments, other types of processor arrangements are used in processor 300 to provide for the capabilities disclosed herein.

Email interface 305 enables collaboration server 105 (e.g., processor 300) to communicate with email server 145 by emails. Email interface 305 includes both software and hardware components. In some embodiments, email interface 305 includes an email application or software, such as a web-based email portal. Email interface 305 also includes hardware components, such as circuits and processors configured for email applications.

Text message interface 310 enables collaboration server 105 (e.g., processor 300) to communicate with text message server 150 by text messages. Text message interface 310 includes both software and hardware components. In some embodiments, text message interface 310 includes a text messaging application or software, such as an instant messaging interface. Text message interface 310 includes hardware components, such as circuits and processors configured for text messaging applications.

In some embodiments, email interface 305 and text message interface 310 are integrated within an electronic messaging interface that is provided with email and text message handling functions. In such embodiments, separate email interface 305 and text message interface 310 are not provided.

In some embodiments, user device 200 includes an email interface, which may be similar to email interface 305. The email interface included in user device 200 enables user device 200 to send and receive emails to and from other systems and devices, such as collaboration system 101. In some embodiments, user device 200 includes a text message interface, which is similar to text message interface 310. The text message interface included in user device 200 enables user device 200 to send and receive text messages to and from other systems and devices, such as collaboration system 101.

Based on an input received from a caller (e.g., user of telephone 135 or any other user devices 120A-120D), telephone server 140 initiates a call (e.g., a telephone call) to collaboration system 101 (FIG. 1). For example, in some embodiments, telephone server 140 initiates the call to a participant of a collaboration session directly (e.g., by calling a phone number associated with a user device of the participant). In some embodiments, telephone server 140 initiates the call to a collaboration session that is associated with a phone number.

In some embodiments, before, after, and during the call, based on an input received from the caller, electronic message server 148 sends electronic messages to collaboration server 105. For example, based on the input received from the caller, email server 145 sends an email to collaboration server 105. Based on an input received from the caller, text message server 150 sends a text message to collaboration server 105. The electronic messages (e.g., email and/or text message) provide contextual information regarding the call. The contextual information includes the purpose of the call (e.g., to discuss a marketing idea). After collaboration server 105 receives the electronic messages, collaboration server 105 analyzes the content of the electronic messages, and based on the analysis, identifies the contextual information (e.g., the purpose of the call is to discuss a marketing idea) relating to the call.

Collaboration server 105 uses the contextual information identified from the electronic messages received from the caller, including ongoing electronic messages and archived electronic messages, to determine or identify a collaboration session from a plurality of collaboration sessions as a destination to direct the call. For example, collaboration server 105 may analyze prior emails about marketing with expectation that a call from the marketing representative will be forthcoming. When collaboration server 105 receives a call from the marketing representative, collaboration server 105 directs the call to a collaboration session of the marketing department. As another example, when a product manager calls, collaboration server 105 analyzes prior electronic messages exchanged during collaboration sessions and identify a collaboration session that discussed product improvements, and directs the call to the collaboration session. In some embodiments, collaboration server 105 analyzes ongoing emails or text messages exchanged between participants in a plurality of collaboration sessions to identify a collaboration session in which a subject of discussion relates to or closely matches the contextual information related to the call, and directs the call to the identified collaboration session. The process of identifying a collaboration session from a plurality of collaboration sessions is not performed if there is only one collaboration session in collaboration system 101, or if the dialed number is assigned to a particular collaboration session.

After identifying the collaboration session, collaboration server 105 causes a notification (e.g., a call notification user interface) regarding the incoming call to be displayed within a collaboration interface of the collaboration session that is displayed on the user device associated with at least one participant in the collaboration session. The same or similar interfaces are displayed on some or all of the user devices of the participants of the collaboration session, enabling the participants to collaborate (e.g., share communication content) with one another using various communication mechanisms.

In some embodiments, the at least one participant is an administrator or moderator of the collaboration session. The notification is displayed within the collaboration interface of the moderator of the collaboration session. The moderator manages the call, or identifies a participant to manage the call.

In some embodiments, the at least one participant includes some or all of the participants, and the notification is displayed within the collaboration interface of the collaboration session that is displayed on the user devices associated with some or all of the participants. In some embodiments, the notification includes contextual information regarding the call, or the contextual information is displayed within the collaboration interface as a message adjacent, within, or separate from the notification. Collaboration server 105 determines a participant to receive the call based on the contextual information. In some embodiments, collaboration server 105 determines a participant to receive the call based on a user input (e.g., a drag and drop input on the notification) received at a user device associated with the moderator of the collaboration session.

In some embodiments, after identifying the participant of the call (the participant may be referred to as the recipient participant), collaboration server 105 enables display of a same, similar, or different notification regarding the call within the collaboration interface of the collaboration session on the user device associated with the recipient participant to enable the participant to provide an input to the user device to instruct the user device to handle the call (e.g., answering the call, rejecting the call, forwarding the call to someone, or diverting it to voice mail).

Collaboration server 105 includes one or more storage devices configured to store information used by processor 300 (or other components) to perform certain functions related to the disclosed embodiments. For example, collaboration server 105 includes memory 320 that includes instructions to enable collaboration server 105 to execute one or more applications, such as server apps 330, operating system 335, and any other type of application or software known to be available on computer systems. Alternatively or additionally, the instructions, application programs, etc. are stored in database 110 and/or storage device 125, which are external to collaboration server 105. In some embodiments, database 110 and/or storage device 125 are included within collaboration server 105.

Memory 320, database 110, and/or storage device 125 include a volatile or non-volatile, magnetic, semiconductor, tape, optical, removable, non-removable, or other type of storage device or tangible or non-transitory computer-readable medium. Memory 320, storage device 125, and/or database 110 include one or more memory devices that store data and instructions that processor 300 accesses, for example, to perform one or more features of the disclosed embodiments. Memory 320, storage device 125, and/or database 110 also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, memory 320 is a volatile or non-volatile, magnetic, semiconductor, tape, optical, removable, non-removable, or other type of storage device or tangible or non-transitory computer-readable medium that stores one or more program(s) 325 such as server apps 330 and operating system 335, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Programs 325 include one or more software modules causing collaboration server 105 to perform one or more functions of the disclosed embodiments. Moreover, collaboration server 105 executes one or more programs located remotely from one or more components of communication system 100. For example, collaboration server 105 accesses one or more remote programs that, when executed, perform functions related to disclosed embodiments.

Server app(s) 330 cause collaboration server 105 to perform one or more functions of the disclosed methods. For example, server app(s) 330 cause collaboration server 105 to establish a communication group (e.g., a collaboration session) among a plurality of participants. Server app(s) 330 also cause collaboration server 105 to provide an interface within a collaboration interface of the collaboration session to enable one or more participants of the collaboration session to instruct at least one user device to handle a call initiated outside of the collaboration session. In some embodiments, other components of the communication system 100 are configured to perform one or more functions of the disclosed methods. For example, user devices 120A-120D are configured to receive a user input relating to a notification for specifying a recipient participant to receive the call.

In some embodiments, program(s) 325 include(s) operating system 335 performing operating system functions when executed by one or more processors such as the processor 300. By way of example, operating system 335 includes Microsoft Windows™ Unix™, Linux™, Apple™ operating systems, Personal Digital Assistant (PDA) type operating systems, such as Microsoft CE™, or other types of operating systems. Accordingly, disclosed embodiments may operate and function with computer systems running any type of operating system 335. Collaboration server 105 also includes software that, when executed by processor 300, provides communications with network 115 through a network interface 350 and/or a direct connection to one or more user devices 120A-120D.

In some embodiments, data 340 includes, for example, profiles of participants of a communication group (e.g., a collaboration session). Profile information of a user or participant may include, for example, a function within an organization, a job title, technical expertise, education, language, and prior communication with the caller, etc. In some embodiments, data 340 includes instant messages sent by the participants during an ongoing collaboration session, documents and audio/video files shared by the participants of the collaboration session, communication content (e.g., messages, documents, and files, etc.) archived for a prior collaboration session, and access control settings associated with the shared documents and/or files.

Collaboration server 105 also includes one or more I/O devices 345 having one or more interfaces for receiving signals or input from devices and providing signals or output to one or more devices that allow data to be communicated (received and/or transmitted) by collaboration server 105. In some embodiments, I/O devices 345 include interface components for interfacing with one or more input devices, such as one or more keyboards, mouse devices, touch screen, USB data ports, and the like, which enable collaboration server 105 to receive input from a user (e.g., an operator or administrator) of collaboration server 105.

Network interface 350 includes hardware components and software components that enable collaboration server 105 to communicate with network 115. In some embodiments, network interface 350 includes a modem, an Ethernet card, an Ethernet cable port, a WiFi transceiver, and/or software including instructions and protocols for communication.

Telephone service interface 315 includes hardware and software components that enable collaboration server 105 to communicate with a telephone system that includes telephone server 140. Telephone server interface 315 enables collaboration server 105 to receive a telephone call from the telephone system. For example, based on an input received from a user of telephone 135 or any of user devices 120, telephone server 140 initiates a call to a collaboration session or a participant of the collaboration session. Collaboration server 105 receives the call through telephone service interface 315. Telephone service interface 315 is also associated with other devices included in collaboration system 100, for example, to route, direct, or forward a call to a collaboration session, and/or to a user device associated with a participant.

When a plurality of collaboration sessions are included in collaboration system 101, collaboration server 105 identifies one of the collaboration sessions for receiving an incoming call from telephone server 140. Collaboration server 105 identifies the collaboration session through various methods. In some embodiments, each collaboration session is associated with a unique identifier, such as a name, a telephone number, an extension number, etc. When a call is initiated by telephone server 140, the call specifies an identifier of a collaboration session. Collaboration server 105 automatically identifies a collaboration session by matching the identifier specified by the call with the unique identifier of the collaboration session, and route the call to the identified collaboration session. In some embodiments, the identifier specified by the call is represented as a caller ID.

As another example, collaboration server 105 obtains contextual information regarding the call. Contextual information is obtained through various methods. In some embodiments, collaboration server 105 obtains contextual information based on an input provided by the caller during an Interactive Voice Response (IVR) process, one or more electronic messages (e.g., emails from email server 145 and/or text messages from text message server 150) regarding the call sent by the caller before, after, or during the time the call is initiated through telephone server 140. Collaboration server 105 also obtains contextual information based on communication history (e.g., prior communication content archived in database 110 and/or storage device 125) involving the caller, including, for example, prior electronic messages (emails and/or text messages) received from the caller, and/or notes taken during prior calls, which are related to the caller.

In some embodiments, before, after, or during the time the call is initiated through telephone server 140, an IVR system associated with telephone server 140 prompts the caller to answer questions by inputting selections of menu options or by a voice input. The user input received from the caller relates to the subject matter of the call (e.g., purpose of the call is to discuss a marketing idea). After the caller inputs the purpose of the call, telephone server 140 provides the user input to collaboration server 105. Collaboration server 105 analyzes the input during the IVR process to obtain contextual information regarding the call. In some embodiments, the IVR system sends the user input to electronic message server 148 (e.g., to email server 145 and/or text message server 150), which sends an electronic message (e.g., an email and/or a text message) including the user input to collaboration server 105. Collaboration server 105 analyzes the electronic message to identify contextual information relating to the call, e.g., the purpose of the call is to discuss a marketing idea.

In some embodiments, the caller sends electronic messages (e.g., emails and/or text messages) to collaboration server 105 before, after, or during the time the call is initiated. The electronic messages received from electronic message server 148 (e.g., email server 145 and/or text message server 150) indicate the subject matter of the call. Collaboration server 105 analyzes the electronic messages to identify the contextual information regarding the call. In some embodiments, collaboration server 105 obtains communication history involving the caller from database 110 and/or storage device 125. The communication history includes prior communication content, such as emails, text messages, and/or prior phone call records. Collaboration server 105 analyzes the communication history to obtain contextual information regarding the call.

Collaboration server 105 identifies the subject matter of the call (e.g., to discuss a marketing idea) based on the contextual information. For example, collaboration server 105 identifies a collaboration session from a plurality of collaboration sessions based on the subject matter of the call and information (e.g., characteristics) of the collaboration sessions. In some embodiments, collaboration server 105 compares the subject matter of the call with information regarding the collaboration sessions, such as characteristics of the collaboration session including the subject of discussion and the profile of the participants of the collaboration session. For example, collaboration server 105 identifies the collaboration session to receive the call when it determines that the subject of discussion of the collaboration session matches or closely relates to the subject matter of the call.

As another example, collaboration server 105 identifies the collaboration session to receive the call by comparing the subject matter of the call with the profile of the participants. The profile of the participants of the collaboration sessions includes various information regarding the participants, such as a function within an organization (marketing, sales, legal, customer services, etc.), a job title (e.g., Marketing Assistant, Legal Counsel, Sales, Customer Services, etc.), technical expertise (e.g., engineering, sales, marketing, legal advice, etc.), education, language (e.g., English, Spanish, German, etc.), and prior communication with the caller (e.g., notes showing a participant having communicated with caller), etc. Collaboration server 105 determines, based on the profile and the subject matter of the call, that some participants of a collaboration session are best suited to answer the call. For example, if the subject matter of the call relates to marketing, collaboration server 105 identifies a collaboration session having participants from the marketing department as the destination collaboration session for the call.

Figure 4:
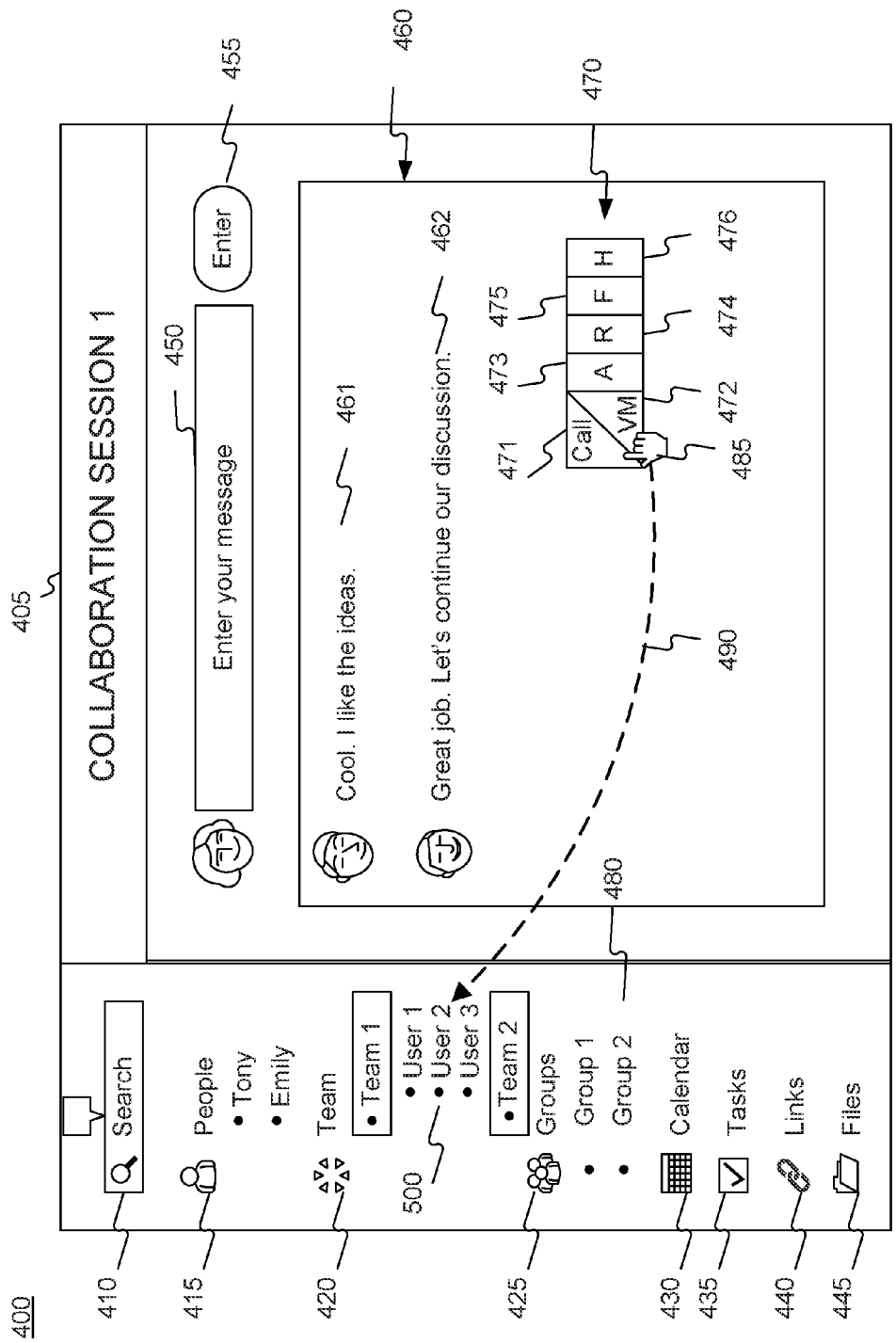
FIG. 4 illustrates an example collaboration interface associated with a collaboration session, in accordance with the disclosed embodiments.

After a collaboration session is identified, collaboration server 105 directs the call to the collaboration session. FIG. 4 shows an example collaboration interface 400 for a collaboration session that is displayed on user devices (e.g., user devices 120A-120D), which may be handheld devices, smart phones, tablets, desktop computers, laptop computers, and servers (e.g., collaboration server 105) included in collaboration system 101 for managing calls in a collaboration session. The collaboration session enables two or more users (or participants) to collaborate with each other, such as sharing contents (files and/or documents) and communicating electronically using text-based, audio-based, and/or video-based communication mechanisms. Each participant of the collaboration session is associated with at least a user device (e.g., one of user devices 120A-120D) that displays a similar collaboration interface 400. Collaboration interface 400 is also displayed on a computer and/or server associated with an administrator of collaboration system 101 and/or moderators of the collaboration sessions.

Collaboration interface 400 provides a collaborative platform enabling participants to communicate and collaborate with each other. For example, collaboration interface 400 enables participants to exchange information through online communication, to access calendars (e.g., send and receive calendar invitations), to access tasks list (e.g., share tasks and/or progresses of a task), to share files, documents, and webpages, and to process files (e.g., opening, editing, sharing documents stored in the user device and/or in collaboration server 105), and to access archived (or cached or temporarily deleted) communication content (including messages, files, and/or documents).

As shown in FIG. 4, collaboration interface 400 includes or displays a plurality of selectable (e.g., clickable, touchable) user interface items. In some embodiments, collaboration interface 400 includes fewer or additional selectable interface items. In the example shown in FIG. 4, collaboration interface 400 includes a header section 405 indicating that collaboration interface 400 is associated with "collaboration session 1," which may be a past session or an ongoing session. If the collaboration session is no longer active, it may be marked as an archived or deleted collaboration session. Collaboration interface 400 includes a search box 410, which is configured to receive an input of a key word or a key phrase for searching the word or phrase in a plurality of resources, such as a contacts list, a list of teams, a list of groups, a calendar, a tasks list, a file folder, etc. Collaboration interface 400 displays a list of people 415 (people list 415 or contacts list 415), listing contacts of the user associated with the user device on which collaboration interface 400 is displayed. In the example shown in FIG. 4, two persons, "Tony" and "Emily" are included in the list of people 415.

Collaboration interface 400 displays a list of teams 420, such as "Team 1" and "Team 2." Under each team, one or more users associated with the team are also displayed. In the example shown in FIG. 4, three users "User 1," "User 2," and "User 3" are listed under team 1. Collaboration interface 400 displays a list of groups 425. For example, two groups "Group 1" and "Group 2" are included in list of groups 425. In some embodiments, a group includes one or more teams. A team includes participants from different groups or the same group. In the example shown in FIG. 4, collaboration session 1 may include participants from Team 1, Team 2, Group 1, or Group 2.

Collaboration interface 400 displays an icon 430 for accessing a calendar. When collaboration server 105 receives a user input on icon 430 (e.g., an input indicating selection of icon 430), collaboration server 105 causes a calendar to be displayed within collaboration interface 400 of the collaboration session 1. In some embodiments, collaboration server 105 causes the calendar to be displayed outside of collaboration interface 400, for example, through an interface separate from collaboration interface 400 for displaying calendars.

Collaboration interface 400 displays an icon 435 for accessing a list of tasks. When collaboration server 105 receives a user input on icon 435 (e.g., an input indicating selection of icon), collaboration server 105 causes a list of tasks to be displayed within collaboration interface 400 of the collaboration session 1. In some embodiments, collaboration server 105 causes the list of tasks to be displayed outside of collaboration interface 400, for example, through an interface separate from collaboration interface 400 for displaying tasks.

Collaboration interface 400 includes a textbox 450 enabling the user (participant) associated with the user device that displays collaboration interface 400 to enter a text message for communicating with other participants of the collaboration session. Collaboration interface 400 includes an "Enter" button 455, selectable (e.g., clickable or touchable) by a user. After receiving a user input of the text message in textbox 450, when detecting a user input of selecting the "Enter" button 455 (or some other entry assigned to initiate the same operation) collaboration server 105 causes the entered text message to be sent and entered into a communication zone 460 and displayed therein. Other methods may be used to enter a message. For example, collaboration interface 400 may include an audio and/or video input element enabling a user to record an audio and/or video message and post the recorded message. Communication zone 460 displays communication content, such as audio and/or video messages, text messages (e.g., text messages 461 and 462, entered by a plurality of participants of the collaboration session), documents, files, emotional icons, images, links to websites (e.g., URLs), etc.

In some embodiments, while a participant is using collaboration interface 400, the collaboration session receives a call from outside of the collaboration session. In some embodiments, telephone server 140 initiates a call based on an input received from a user of telephone 135. In other embodiments, telephone server 140 initiates the call based on an input received from a participant of another collaboration session in the same collaboration system 101, or from a participant of another collaboration system. The call may be a video, and/or an audio call.

As shown in FIG. 4, collaboration server 105 causes a notification 470 to be displayed within collaboration interface 400 of the collaboration session. Notification 470 is displayed within collaboration interface 400 integrated within a desktop client application, a mobile application, or a desktop or mobile web browser. Notification 470 alerts the user associated with the user device on which collaboration interface 400 is being presented that a call (e.g., a telephone call, a video and/or audio call) or a voice message has been received. In some embodiments, notification 470 includes one or more elements. Notification 470 is repositioned temporarily or permanently within collaboration interface 400 as a whole unit, or each of the elements is separable from notification 470 and be moved and repositioned within collaboration interface 400. In some embodiments, each of the elements is selectable (e.g., touchable, clickable, draggable, etc.). When collaboration server 105 receives a user input of one of the elements included in notification 470, collaboration server 105 executes a predetermined action associated with the one of the elements. In the example shown in FIG. 4, notification 470 includes an element 471 indicating a call has been received. Although element 471 includes text "call" to indicate a call, element 471 may include other means, such as icons, images, animations, etc., to indicate a received call. In some embodiments, notification 470 includes an element 472 indicating that a voice message has been received. Although element 472 includes text "VM" to indicate a voice message, element 472 may include other means, such as icons, images, animations, etc., to indicate a received voice message.

Notification 470 includes elements 473-476 to indicate various options for instructing the device how to handle the call. For example, notification 470 includes an element 473 associated with answering a call, an element 474 associated with rejecting the call, an element 475 associated with forwarding the call to another recipient or to a voicemail, an element 476 for hiding the call (e.g., such that notification 470 disappears from collaboration interface 400). Each of the elements included in notification 470 may be separable from notification 470, and be repositioned within collaboration interface 400 (e.g., being separated from notification 470, dragged and dropped at another portion of collaboration interface 400). In some embodiments, notification 470 may be dragged and dropped as a single interface, and be repositioned within collaboration interface 400.

Collaboration server 105 causes notification 470 regarding the call to be displayed in collaboration interface 400 on at least one user device associated with at least one participant of the collaboration session. In some embodiments, collaboration server 105 causes notification 470 to be displayed within collaboration interface 400 displayed on the user device (e.g., one of user devices 120A-120D) associated with a moderator or administrator of the collaboration session. In some embodiments, collaboration server 105 causes notification 470 to be displayed within collaboration interface 400 displayed on the user devices associated with some or all of the participants of the collaboration session.

As shown in FIG. 4, collaboration server 105 receives a drag and drop input (as represented by a hand-shaped cursor 485 and a dashed line 490) on notification 470 from a user associated with the user device on which collaboration interface 400 is displayed. The drag and drop input may cause notification 470 as a single interface or one or more elements of notification 470 to be repositioned within collaboration interface 400, e.g., to be placed onto an icon 500 representing "User 2" in "Team 1", who is a participant of collaboration session 1. Based on the drag and drop input, collaboration server 105 identifies User 2 as a recipient of the call, and directs (e.g., forwards or routes) the call to the user device associated with User 2.

In some embodiments, notification 470 is displayed within collaboration interface 400 displayed on a user device (e.g., one of user devices 120A-120D) of a moderator or a participant of collaboration session 1. The moderator or participant determines which participant of the collaboration session should receive the call, and drags and drops notification 470 onto an icon representing that participant (e.g., icon 500 representing user 2 listed under Team 1).

In some embodiments, the moderator and/or a participant provides an input on notification 470 to instruct the user device associated with the moderator and/or the participant to handle the call. For example, in some embodiments, notification 470 is displayed within collaboration interface 400 on the user devices associated with the moderator of the collaboration session 1 and/or some or all of the participants of collaboration session 1. The moderator and/or a participant may click, press, or touch the selectable elements 473-476 displayed on notification 470 to instruct the user device associated with the moderator and/or the participant to handle the call, such as answering the call (by pressing, clicking, or touching element 473), rejecting the call (by pressing, clicking, or touching element 474), forwarding the call to another participant, collaboration session, or phone number (by pressing, clicking, or touching element 475), or hiding the call (by pressing, clicking, or touching element 476).

Figure 5:
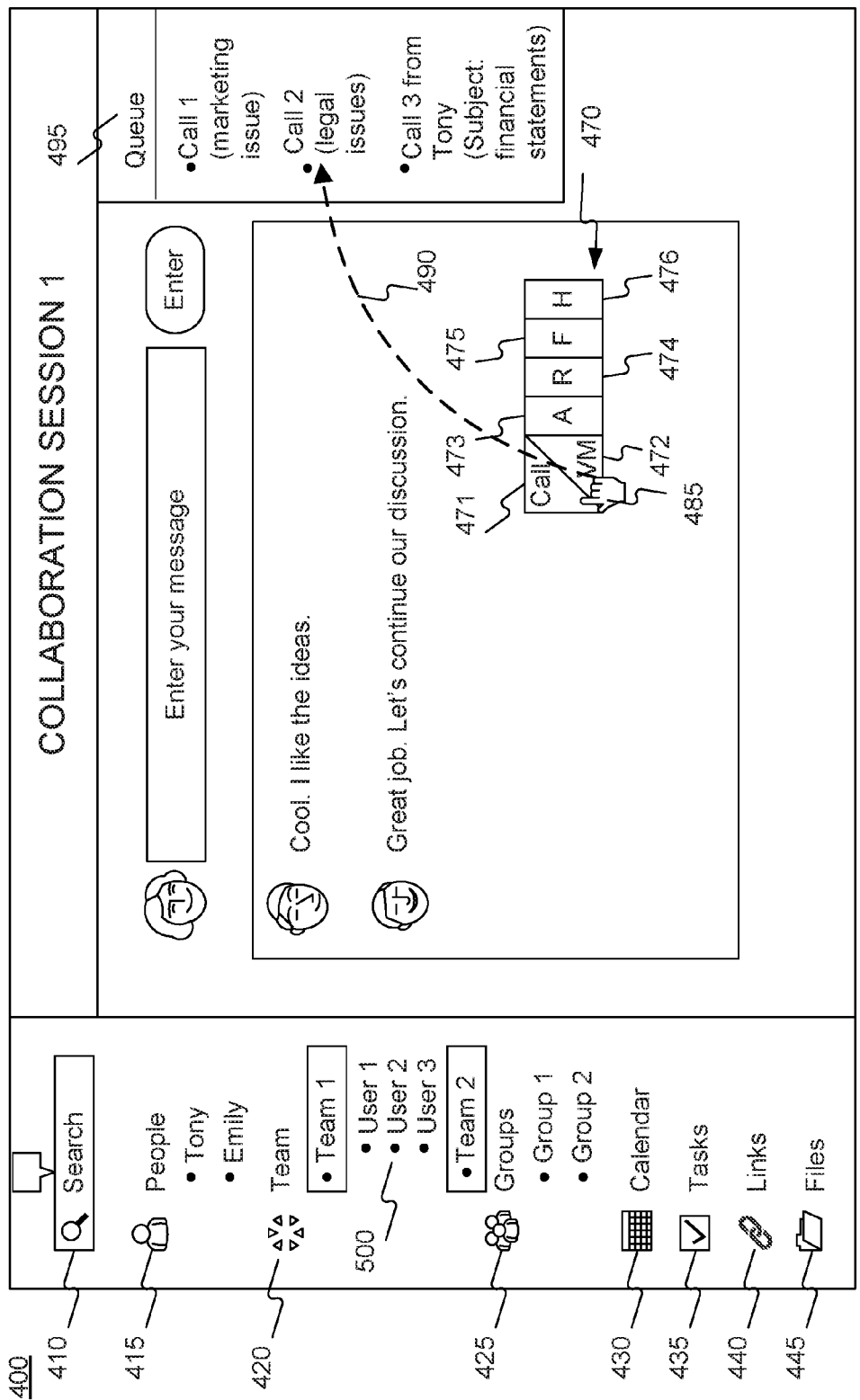
FIG. 5 illustrates another example collaboration interface associated with a collaboration session in accordance with the disclosed embodiments.

FIG. 5 shows an example collaboration interface and the methods of identifying a participant of a collaboration session as a recipient of a call. Collaboration interface 400 displays a queue 495 listing one or more calls waiting to be answered. In some embodiments, notification 470 is displayed within collaboration interface 400 displayed on the user device associated with the moderator of the collaboration session. The moderator may manually place the call in queue 495 by dragging and dropping notification 470 or one or more elements of notification 470 into the list of queue 495. Upon receiving the drag and drop input on notification 470, collaboration server 105 places the call in queue 495.

In some embodiments, collaboration server 105 automatically places the incoming calls in a queue 495 of calls displayed within collaboration interface 400. In such embodiments, collaboration interface 400 does not display notification 470. Queue 495 displays calls in a list, with the older calls on the top and newer calls at the bottom. In some embodiments, the calls are sorted in queue 495 in other orders, such as based on the importance of the calls. Queue 495 is displayed on the user devices associated with some or all of the participants of the collaboration session. When a call is answered, collaboration server 105 updates queue 495 to remove the call. The update is reflected on collaboration interface 400 displayed on some or all of the participants (including the moderator) of the collaboration session. A brief description of each incoming call is displayed in queue 495. For example, as shown in FIG. 5, "marketing issue" is displayed to describe "Call 1," "legal issues" is displayed to describe "Call 2." Additionally and/or alternatively, caller's identity, such as names, handles, avatars, pseudo names, login names, or the like, is displayed for each call, if the caller's identity is identified by collaboration server 105 from the contextual information. For example, collaboration server 10 identifies the caller's identity from the electronic messages (e.g., emails and/or text messages) received from the caller before, after, or during the time the call is initiated through telephone server 140. As another example, a caller's identity may be entered by the caller, via a text or voice input, during the IVR process when the caller initiates the call. Collaboration server 105 analyzes the electronic messages, and the caller's input during the IVR process to identify the caller's identity. For example, in some embodiments, collaboration interface 400 displays, in queue 495, "Call 3 from Tony (Subject: financial statements)."

In some embodiments, the calls in queue 495 are manually reassigned to a participant. For example, in some embodiments, the moderator or any participant (e.g., a first participant) determines who should answer the call, and specifies the recipient participant (e.g., a second participant) by, for example, dragging and dropping a call in from queue 495 (e.g., a first call in the queue or any call in the queue) onto an icon (e.g., icon 500) representing the recipient participant displayed in the user device associated with the first participant. Upon receiving the drag and drop input from the user device associated with the moderator or any participant, collaboration server 105 identifies the second participant as the recipient of the call, and directs the call to the second participant.

In some embodiments, collaboration server 105 automatically assigns a call to a participant based on the availability data of the plurality of participants. For example, collaboration server 105 analyzes the availability data, which may be stored in database 110 and/or storage device 125, to determine which participant is available, or may become available in the next 1 minute, 2 minutes, 5 minutes, etc., and assigns a call or a number of calls to the identified participant.

After collaboration server 105 identifies the user or participant to receive the call, collaboration server 105 provides an interface on a user device (e.g., one of user device 120A-120D) associated with the identified user or participant. The interface may be a call notification interface that is similar to notification 470, or different from notification 470. The interface is displayed within collaboration interface 400 displayed on the user device associated with the user. The interface enables the identified user to instruct the user device to handle the call within the collaboration session, such as answering the call, forwarding the call, diverting the call to a voicemail, or rejecting the call, etc.

Figure 6:
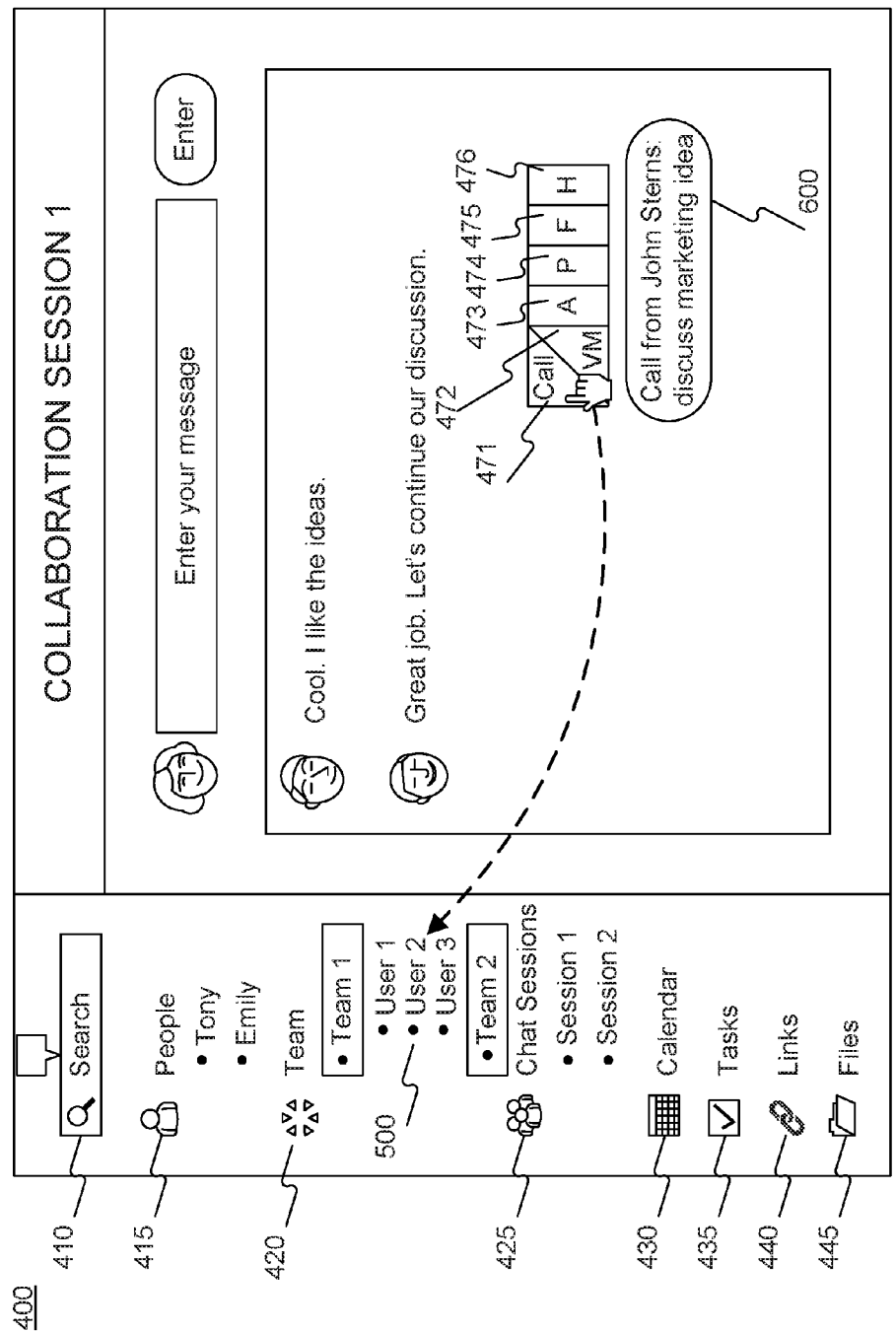
FIG. 6 illustrates another example collaboration interface associated with a collaboration session, in accordance with the disclosed embodiments.

FIG. 6 shows a collaboration interface including a display of contextual information regarding the call as a message. As discussed above, collaboration server 105 identifies the contextual information based on the user input received from the user's selections of options presented to the caller by an IVR system, an electronic message received from electronic message server 148 (e.g., an email received from email server 145, and/or a text message received from text message server 150), prior exchanges of electronic messages or other data with or associated with the user, subject of calendar events with the user, etc. In some embodiments, collaboration server 105 retrieves communication history involving the caller (including emails, text messages, notes about prior calls, etc.) from storage device 125 and/or database 110. Collaboration server 105 identifies the contextual information based on the communication history. In some embodiments, collaboration server 105 identifies the contextual information based on a combination of the user input received from the IVR system, the electronic messages received from the electronic message server 148, and the communication history stored in database 110 and/or storage device 125.

Collaboration server 105 causes the contextual information regarding the call to be displayed as a message 600 within collaboration interface 400 of the collaboration session when notification 470 regarding the call is also displayed. In the example shown in FIG. 6, collaboration server 105 causes message 600 "Call from John Sterns: discuss marketing idea" to be displayed adjacent notification 470 as a separate item. In some embodiments, message 600 is displayed within notification 470, or attached to notification 470.

Message 600 provides contextual information to a participant and/or moderator of the collaboration session, such that the participant and/or moderator may determine the subject matter of the call. The participant and/or moderator of the collaboration session determines which participant is best suited to receive the call based on a comparison of the subject matter of the call and the profile information of the participants. For example, the moderator or any participant, to whom notification 470 and message 600 are displayed, determines that User 2 listed under Team 1 is best suited to answer the call. In some embodiments, the determination is based on the contextual information regarding the call (as shown in message 600) and the profile of the participants of the collaboration session. For example, the profile of the participants of the collaboration sessions includes various type of information regarding the participants, such as a function within an organization (e.g., member of a marketing department, member of legal department, etc.), a job title (e.g., Marketing Assistant, Legal Counsel, Sales, Customer Services, etc.), technical expertise (e.g., engineering, sales, marketing, etc.), education, language (e.g., Spanish, English, German), and prior communication with the caller. In some embodiments, the moderator or any participant determines, based on the profile and the subject matter of the call, that User 2 is best suited to answer the call. For example, if the subject matter of the call relates to marketing, the moderator or any participant determines that User 2 from the marketing department is best suited to answer the call, and drags and drops notification 470 with or without message 600 onto icon 500 representing User 2. After receiving the drag and drop input, collaboration server 105 identifies User 2 as a recipient of the call, and directs the call to User 2. In some embodiments, after receiving the drag and drop input, collaboration server 105 displays the same notification 470 and message 600 or similar notification and message on a user device associated with User 2 to enable User 2 to instruct the user device to handle the call (e.g., answer the call, reject the call, divert the call to voicemail, or hide the call, etc.). The contextual information shown in message 600 assists User 2 to understand the purpose and/or subject matter of the call.

In some embodiments, when a user receives the call, the user responds to the call using communication mechanisms other than audio and/or voice communication mechanisms. For example, in some embodiments, the user types a text message within collaboration interface 400 in response to a call, and collaboration server 105 converts the text message into an audio/voice message and directs the audio/voice message to the caller or to a device (e.g., telephone 135 or any of user devices 120A-120D) associated with the caller, or terminates the call and sends the text message to the user.

Figure 7:
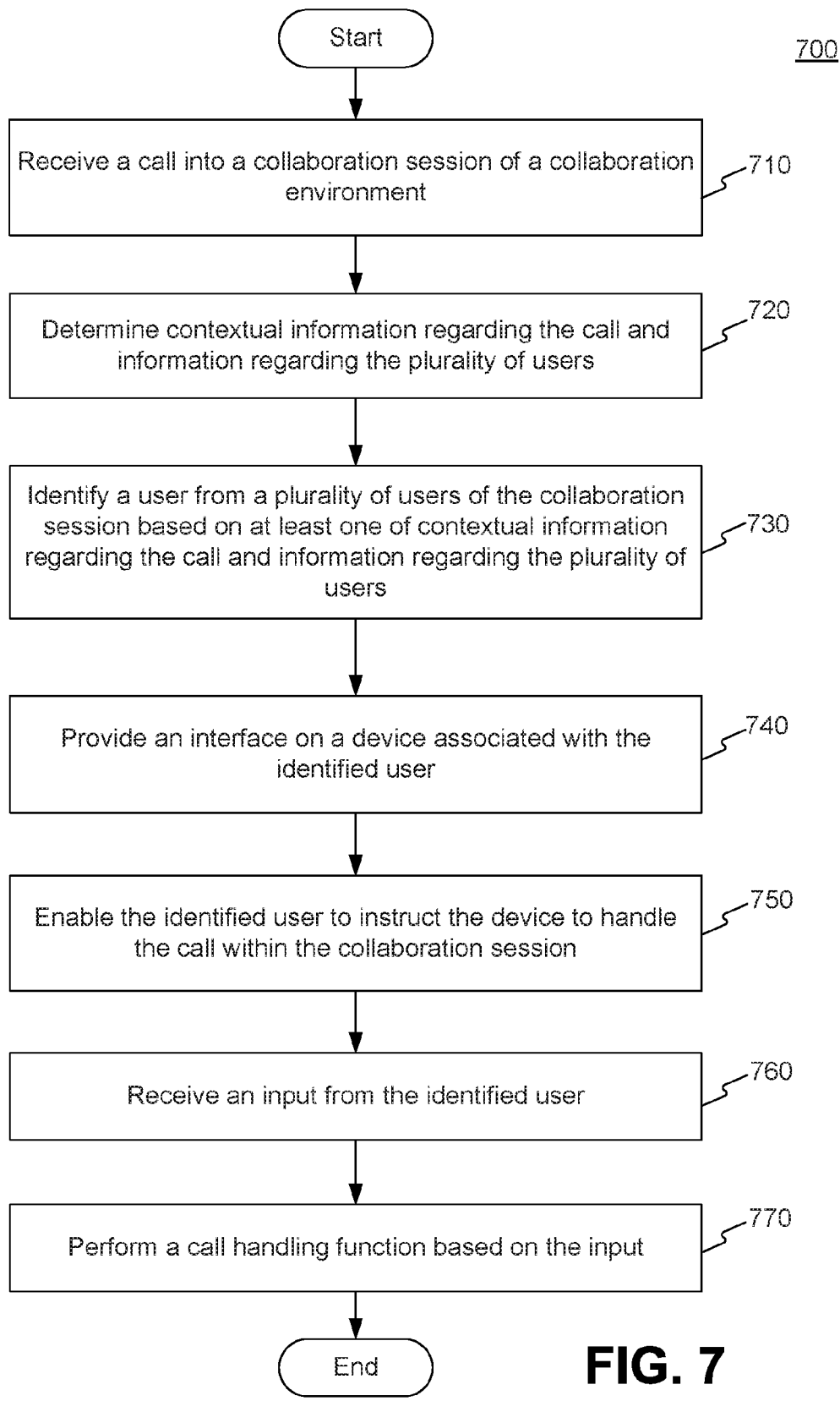
FIG. 7 is a flowchart of an example process for managing calls in a collaboration session, in accordance with embodiments of the present disclosure.

FIG. 7 is a flowchart illustrating an example method 700 for managing calls in a collaboration session. Method 700 can be performed by various devices disclosed above. For example, in some embodiments, method 700 is performed by user devices 120A-120D. In other embodiments, method 700 is performed by collaboration server 105.

Method 700 includes receiving a call into a collaboration session of a collaboration environment, such as collaboration system 101 (step 710). For example, in some embodiments, a collaboration session included in collaboration system 101 receives a call, such as a telephone call, from telephone server 140 located outside of the collaboration session. A caller of telephone 135 dials a telephone number associated with collaboration system 101 and/or a collaboration session, and telephone server 140 initiates and directs the call to collaboration server 105. Alternatively or additionally, telephone server 140 directs the call to a desktop or mobile software application that is provided with call receiving and handling functions, to a desktop or mobile web browser that is provided with call receiving and handling functions, or to a native dialer provided within the user devices 120A-120D.

Method 700 also includes determining contextual information regarding the call and information regarding the plurality of users (step 720). The contextual information may indicate the subject matter of the call, such as the purpose of the call. In some embodiments, collaboration server 105 analyzes an input received from the caller's selections through the IVR system, electronic messages (e.g., emails and/or text messages) received from the caller before, after, or during the time the call is initiated, and/or other communication history involving the caller to identify contextual information regarding the call. For example, when the call is initiated, the caller may provide additional information regarding previous emails and/or text messages (e.g., date/time a previous email or text message was sent by the caller, a subject of a previous email or text message) in the IVR process. Collaboration server 105 associates the caller with the previous emails and/or text messages based on the additional information provided by the caller. In other embodiments, collaboration server 105 searches stored communication history (including chat entries during the collaboration session or relating collaboration sessions, emails, text messages, notes taken during a call, etc.) to identify those records that are related to the caller (e.g., by searching the phone number or the name of the caller appearing in the records). When receiving the call, collaboration server 105 accesses the previously received emails and/or text messages to identify the contextual information related to the call. For example, collaboration server 105 estimates, based on the previous emails and/or text messages, that a likely subject matter of the call is related to discussing financial statement because in an earlier email or text message, the caller has indicated that he/she will call again to discuss financial statements.

The information regarding the users includes profile information regarding the users of the collaboration session. The profile information includes a function within an organization (e.g., member of a marketing department, member of legal department, etc.), a job title (e.g., Marketing Assistant, Legal Counsel, Sales, Customer Services, etc.), technical expertise (e.g., engineering, sales, marketing, etc.), education, language (e.g., Spanish, English, German), and prior communication with the caller. Collaboration server 105 accesses storage device 125 or database 110 and determines the information regarding the users from various data saved in storage device 125 or database 110 regarding the users.

Method 700 also includes identifying a user from a plurality of users of the collaboration session based on at least one of contextual information regarding the call and information regarding the plurality of users (step 730). For example, in some embodiments, collaboration server 105 identifies a user or participant of the collaboration session from a plurality of users or participants based on contextual information regarding the call and the profile information regarding the users or participants. In some embodiments, collaboration server 105 compares the contextual information with the profile information of the users or participants of the collaboration session to determine a match. For example, when the subject matter of the call relates to discussing a marketing idea, collaboration server 105 determines that a user from the marketing department is best suited to answer the call. When a user is identified based on the match between the contextual information of the call and the information regarding the users, collaboration server 105 directs the call to the identified user.

Method 700 also includes providing an interface on a user device associated with the identified user (step 740). For example, collaboration server 105 causes an interface, which may be similar to notification 470 or different from notification 470, to be displayed within collaboration interface 400 displayed on the user device associated with the user.

Method 700 also includes enabling the identified user to instruct the device to handle the call within the collaboration session (step 750). For example, the interface displayed within collaboration interface 400 on the user device enables the user to provide an input to instruct the user device to handle the call (e.g., answer the call, reject the call, forward the call to voicemail or another participant, hide the call, etc.).

Method 700 further includes receiving an input from the identified user (step 760). In some embodiments, the input includes at least one of a press, touch, swipe, or click input on the interface selecting an element of the interface representing a call handling function, such as answering the call, forwarding the call, rejecting the call, directing the call to voicemail, holding the call, conferencing the call, etc. In some embodiments, the input includes a drag and drop input on the interface or an element of the interface, which drags the interface or the element to an icon representing another user or collaboration session, and drops the interface or the element onto the icon. In some embodiments, the input includes a drag and drop input on the interface or an element of the interface, which drags and drops the interface or the element into a queue of calls that are waiting to be answered by participants of a collaboration session who become available.

Method 700 further includes performing a call handling function based on the input (step 770). For example, in response to a press, touch, swipe, or click input selecting an element of the interface representing a call handling function, a user device on which the input is received performs the corresponding call handling function, such as answering the call, forwarding the call, etc. As another example, in response to a drag and drop input on the interface or an element of the interface, which drags and drops the interface or the element onto an icon representing another user or collaboration session, the user device on which the input is received forwards or directs the call to the other user or collaboration session. As a further example, in response to an input that drags and drops the interface or an element of the interface into a queue of calls, the device on which the input is received places the call in the queue of calls (e.g., places the call on hold).

In some embodiments, method 700 includes other steps or processes. For example, in some embodiments, collaboration server 105 causes display of a notification (e.g., notification 470) reflecting the call in a collaboration interface (e.g., collaboration interface 400) associated with at least a first user (e.g., a moderator or any participant) of the plurality of users. In some embodiments, collaboration server 105 identifies the user from the plurality of users based on an input on notification 470 (e.g., a drag and drop input discussed above) received from the first user (e.g., a moderator or any participant).

In some embodiments, the contextual information includes a description of the call (such as the purpose of the call is to discuss a marketing idea), and method 700 includes obtaining, for instance by collaboration server 105, the contextual information based on at least one of information received from a caller who made the call (e.g., the user input during the IVR process), and prior communication related to the caller (e.g., emails, text messages, and phone call notes related to the caller).

In some embodiments, the information regarding the plurality of users includes availability data of the plurality of users, and method 700 includes identifying the user based on the availability of the plurality of users. In other embodiments, the input on notification 470 includes a drag and drop input received within collaboration interface 400, which drags notification 470 reflecting the call and drops notification 470 onto an icon (e.g., icon 500) displayed in collaboration interface 400 that represents a target user to receive the call. Identifying the user includes selecting, by collaboration server 105, the target user of the drag and drop input as the user to receive the call.

In some embodiments, method 700 also includes placing, by collaboration server 105, the call in a queue of calls, and identifying, by collaboration server 105, the user to receive the call based on the availability date of the plurality of users. For example, collaboration server 105 determines which participant is currently available or will be available in next 1 minute, 2 minutes, etc., and assigns one or more calls to the participant. In some embodiments, when collaboration server 105 determines that a participant is now available, collaboration server 105 enables that participant to answer a call from queue 495 of calls. Collaboration server 105 updates queue 495 to remove a call when the call is answered by a participant.

In some embodiments, collaboration system 101 includes more than one collaboration sessions. Method 700 includes determining, by collaboration server 105, a target collaboration session to direct the call based on the contextual information regarding the call and characteristics associated with the collaboration sessions. For example, the characteristics associated with a collaboration session include the subject of discussion, a description of the collaboration session, and/or profile information of the participants of the collaboration session. The subject of discussion can be, for example, marketing issues, legal issues, sales issues, customer service issues. The description of the collaboration session can include the subject of discussion. The description may be, for example, "Collaboration Session for Marketing Department," "Collaboration Session for Legal Team," etc. In some embodiments, the descriptions include a description of a functionality of a group of participants, such as "Legal Department," "Marketing Department," etc. In some embodiments, collaboration server 105 compares the subjects of discussion of the collaboration sessions or descriptions of the collaboration sessions with the contextual information regarding the call to identify a collaboration session to receive the call. For example, when the contextual information indicates that the purpose of the call is to discuss a marketing idea, collaboration server 105 identifies a collaboration session that is discussing marketing issues as the target collaboration session, and directs the call to the identified collaboration session. As another example, collaboration server 105 determines from the user profile that at least some participants of a collaboration session are from the marketing department, and directs the call to that collaboration session.

In some embodiments, each collaboration session is associated with a telephone number. Method 700 includes comparing the telephone numbers associated with the collaboration sessions with a telephone number specified or dialed in the call. When collaboration server 105 finds a match between the telephone number dialed and a telephone number of a collaboration session, collaboration server 105 directs the call to that collaboration session.

In some embodiments, collaboration server 105 uses the contextual information to automatically determine or identify a specific user or participant of the identified collaboration session as a recipient of the call. For example, collaboration server 105 compares keyword "marketing" included in the contextual information and information regarding the participants (e.g., a function within an organization, a job title, technical expertise, education, language, and prior communication with the caller, etc.), to identify a match. Collaboration server 105 identifies a participant as the recipient of the call, and directs the call to the participant. Collaboration server 105 enables display of a notification regarding the call (e.g., a notification similar to notification 470) within a collaboration interface for the collaboration session that is displayed on a user device associated with the identified participant. The notification enables the user to provide input to the user device to instruct the user device to handle the call within the collaboration session (e.g., within collaboration interface 400).

In some embodiments, the caller indicates that the call is of private or public nature. The caller specifies that a call is a private or public in the input provided in the IVR process, or in the email and/or text message sent to collaboration server 105 before, after, or during the time the call is initiated. When a call is specified as a private call, notification 470 is not displayed on the user devices of all of the participants. The notification 470 is displayed only on a user device of a selected participant, such as a moderator, or an intended callee (e.g., a participant of the collaboration session).

In the preceding description, various preferred embodiments have been described with reference to the accompanying drawings. It will, however, be evident that various modifications and changes may be made thereto, and additional embodiments may be implemented, without departing from the broader scope of the disclosure. The disclosure and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Therefore, it is intended that the disclosed embodiments and examples be considered as examples only.

What is claimed is:

1. A computer-implemented method for managing calls in a collaboration environment, comprising:
   receiving, by a processor, a call into a collaboration session of the collaboration environment, wherein the collaboration session is associated with a first interface that enables a plurality of users of the collaboration session to communicate with each other using text-based communication; and
   causing, by the processor, display of a notification reflecting the call in the first interface associated with at least a first user of the plurality of users, the notification enabling the first user to handle the call.

2. The computer-implemented method of claim 1, further comprising:
   identifying a second user to receive the call from the plurality of users associated with the collaboration session based on at least one of contextual information regarding the call and information regarding the plurality of users,
   wherein identifying the second user is based on an input on the notification received from the first user.

3. The computer-implemented method of claim 1, wherein the call is a telephone call or a voice message received from outside of the collaboration session through a telephone system.

4. The computer-implemented method of claim 2,
   wherein the contextual information includes a description of the call, and
   wherein the method further comprises obtaining the contextual information based on at least one of information received from a caller who made the call and prior communication records related to the caller.

5. The computer-implemented method of claim 1, wherein the call is received from another collaboration session.

6. The computer-implemented method of claim 1, wherein receiving the call comprises receiving the call while the first interface is in use.

7. The computer-implemented method of claim 2,
   wherein the information regarding the plurality of users includes availability data of the plurality of users, and
   wherein identifying the second user comprises identifying the second user based on the availability of the plurality of users.

8. The computer-implemented method of claim 2,
   wherein the input on the notification comprises a drag and drop input received within the first interface, which drags the notification reflecting the call and drops the notification onto an icon displayed in the first interface that represents a target user, and
   wherein identifying the second user comprises selecting the target user of the drag and drop input as the second user to receive the call.

9. The computer-implemented method of claim 1, further comprising placing the call in a queue of calls, and identifying the second user to receive the call based on availability of the plurality of users.

10. The computer-implemented method of claim 2,
wherein the collaboration environment includes more than one collaboration session, and
wherein the method further comprises determining a target collaboration session to direct the call based on the contextual information regarding the call and characteristics associated with the collaboration sessions.

11. The computer-implemented method of claim 10,
wherein each collaboration session is associated with a telephone number, and
wherein determining the target collaboration session includes comparing the telephone numbers associated with the collaboration sessions with a telephone number dialed in the call.

12. The computer-implemented method of claim 10,
wherein each collaboration session is associated with a description of the collaboration session, and
wherein determining the target collaboration session includes comparing the contextual information regarding the call with the descriptions of the collaboration sessions.

13. The computer-implemented method of claim 12,
wherein the descriptions of the collaboration sessions include at least one of a collaboration subject and a description of a functionality of a group of participants.

14. A communication server for managing calls in a collaboration environment, comprising:
at least one memory configured for storing instructions; and
at least one processor in communication with the at least one memory and configured to execute the instructions to:
receive a call into a collaboration session of the collaboration environment, wherein the collaboration session is associated with a first interface that enables a plurality of users of the collaboration session to communicate with each other using text-based communication; and
cause display of a notification reflecting the call in the first interface associated with at least a first user of the plurality of users, the notification enabling the first user to handle the call.

15. The communication server of claim 14, wherein the call is a telephone call or voice message received from outside the collaboration session through a telephone system.

16. The communication server of claim 14,
wherein the at least one processor is further configured to execute the instructions to identify a second user to receive the call from the plurality of users associated with the collaboration session based on at least one of contextual information regarding the call and information regarding the plurality of users,
wherein the contextual information includes a description of the call, and
wherein the at least one processor is further configured to execute the instructions to obtain the contextual information based on at least one of information received from a caller who made the call and prior communication records related to the caller.

17. The communication server of claim 16,
wherein the information regarding the plurality of users includes at least one of a function within an organization, a job title, technical expertise, education, language, and prior communication with the caller, and
wherein the at least one processor is further configured to execute the instructions to identify the second user from the plurality of users by comparing the contextual information regarding the call with the information regarding the plurality of users.

18. The communication server of claim 16, wherein the information provided by the caller includes at least one of a menu option selected by the caller and a voice input received from the caller during an interactive voice response process.

19. The communication server of claim 16,
wherein the prior communication records related to the caller include at least one of a prior electronic message or a prior telephone call received from the caller, and
wherein the at least one processor is further configured to execute the instructions to obtain the contextual information based on an analysis of at least one of the prior electronic message or the prior telephone call.

20. An electronic device, comprising:
a display configured to display a collaboration interface for a collaboration session, wherein the collaboration interface enables a plurality of users of the collaboration session to communicate with each other using text-based communication; and
at least one processor configured to:
receive a call into the collaboration session; and
cause the display to show a notification reflecting the call in the collaboration interface, the notification including one or more selectable elements for the user to handle the call.

21. A non-transitory computer-readable medium encoded with instructions, which when executed by a processor, cause the processor to perform a method for managing calls in a collaboration environment, the method comprising:
receiving a call into a collaboration session of the collaboration environment, wherein the collaboration session is associated with a first interface that enables a plurality of users of the collaboration session to communicate with each other using text-based communication; and
causing display of a notification reflecting the call in the first interface associated with at least a first user of the plurality of users, the notification enabling the first user to handle the call.

* * * * *